(12) United States Patent
Toth

(10) Patent No.: US 10,562,599 B1
(45) Date of Patent: Feb. 18, 2020

(54) ROCKET LAUNCH PLATFORM STABILIZATION SYSTEM

(71) Applicant: Brian Andrew Toth, Santa Monica, CA (US)

(72) Inventor: Brian Andrew Toth, Santa Monica, CA (US)

(73) Assignee: Active Inertia Offshore, Santa Monica, CA (US)

( * ) Notice: Subject to any disclaimer, the term of this patent is extended or adjusted under 35 U.S.C. 154(b) by 0 days.

(21) Appl. No.: 16/350,001

(22) Filed: Sep. 6, 2018

(51) Int. Cl.
*B63B 39/02* (2006.01)
*B64G 1/00* (2006.01)
*B63B 35/44* (2006.01)

(52) U.S. Cl.
CPC ............. *B63B 39/02* (2013.01); *B63B 35/44* (2013.01); *B64G 1/002* (2013.01)

(58) Field of Classification Search
CPC .......... B63B 39/02; B63B 35/44; B64G 1/002
See application file for complete search history.

(56) References Cited

U.S. PATENT DOCUMENTS

| | | | |
|---|---|---|---|
| 6,469 A | 5/1849 | Lincoln | |
| 3,327,667 A * | 6/1967 | Manning | B63B 9/065 114/256 |
| 4,365,576 A * | 12/1982 | Cook | B63B 35/44 114/257 |
| 4,656,959 A * | 4/1987 | Moisdon | B63B 35/4406 114/264 |
| 6,953,308 B1 | 10/2005 | Horton | |
| 8,471,396 B2 | 6/2013 | Roddier | |

OTHER PUBLICATIONS

Spar Buoy Printed from Wikipedia Sep. 5, 2018.
Hywind—the world's leading floating offshore wind solution, Printed from Wikipedia Sep. 5, 2018.
Floating Wind Turbines Printed from Wikipedia Sep. 5, 2018.
VolturnUS (floating wind turbine) Printed Sep. 5, 2018.
WindFloat (principlepower.com) Printed from website Sep. 5, 2018.
Suction Caisson Printed from Wikipedia Sep. 5, 2018.
Tension-leg platform Printed from Wikipedia Sep. 5, 2018.
Oil Platform Printed from Wikipedia Sep. 5, 2018.
Semi-submersible platform Printed from Wikipedia Sep. 5, 2018.

(Continued)

*Primary Examiner* — Stephen P Avila
(74) *Attorney, Agent, or Firm* — Thomas N. Glaccherini

(57) ABSTRACT

An offshore floating rocket launch platform (12) is disclosed. The platform (12) floats on the surface of a body of water (14). A rocket (16) and a rocket launch support tower (18) are shown on the top surface (19) of the platform (12) in preparation for launch. The platform (12) includes a statically buoyant chamber 20) and more than one variable buoyancy-generating variable buoyancy-generating chambers (22). A number of variable buoying-generating variable buoyancy-generating chambers (22) are capable of being pressurized with a fluid to provide counter-acting forces that compensate for position changes of the platform incurred by natural forces. Other embodiment of the invention may be used for floating offshore structures like buildings (26), bridges (46) and wind turbines (50).

21 Claims, 26 Drawing Sheets

(56) References Cited

OTHER PUBLICATIONS

Heavy-lift ship Printed from Wikipedia Sep. 5, 2018.
Spar (platform) Printed from Wikipedia Sep. 5, 2018.
Ballast Printed from Wikipedia Sep. 5, 2018.
Ballast tank Printed from Wikipedia Sep. 5, 2018.
Autonomous spaceport drone ship Printed from Wikipedia Sep. 5, 2018.
Odyssey (launch platform) Printed from Wikipedia Sep. 5, 2018.
Sea Launch Printed from Wikipedia Sep. 5, 2018.
Air Compressor Printed from Wikipedia Sep. 5, 2018.
Pneumatics Printed from Wikipedia Sep. 5, 2018.
Pneumatic Actuator Printed from Wikipedia Sep. 5, 2018.
Butterfly Valve Printed from Wikipedia Sep. 5, 2018.
List of Valves Printed from Wikipedia Sep. 5, 2018.
Mooring Printed from Wikipedia Sep. 5, 2018.
SpaceX Printed from Wikipedia Sep. 5, 2018.
Stable Printed from Wikipedia Sep. 5, 2018.
Systron Printed from website Sep. 5, 2018.
Pratt—Floating Wind Turbines Printed from website Sep. 5, 2018.

\* cited by examiner

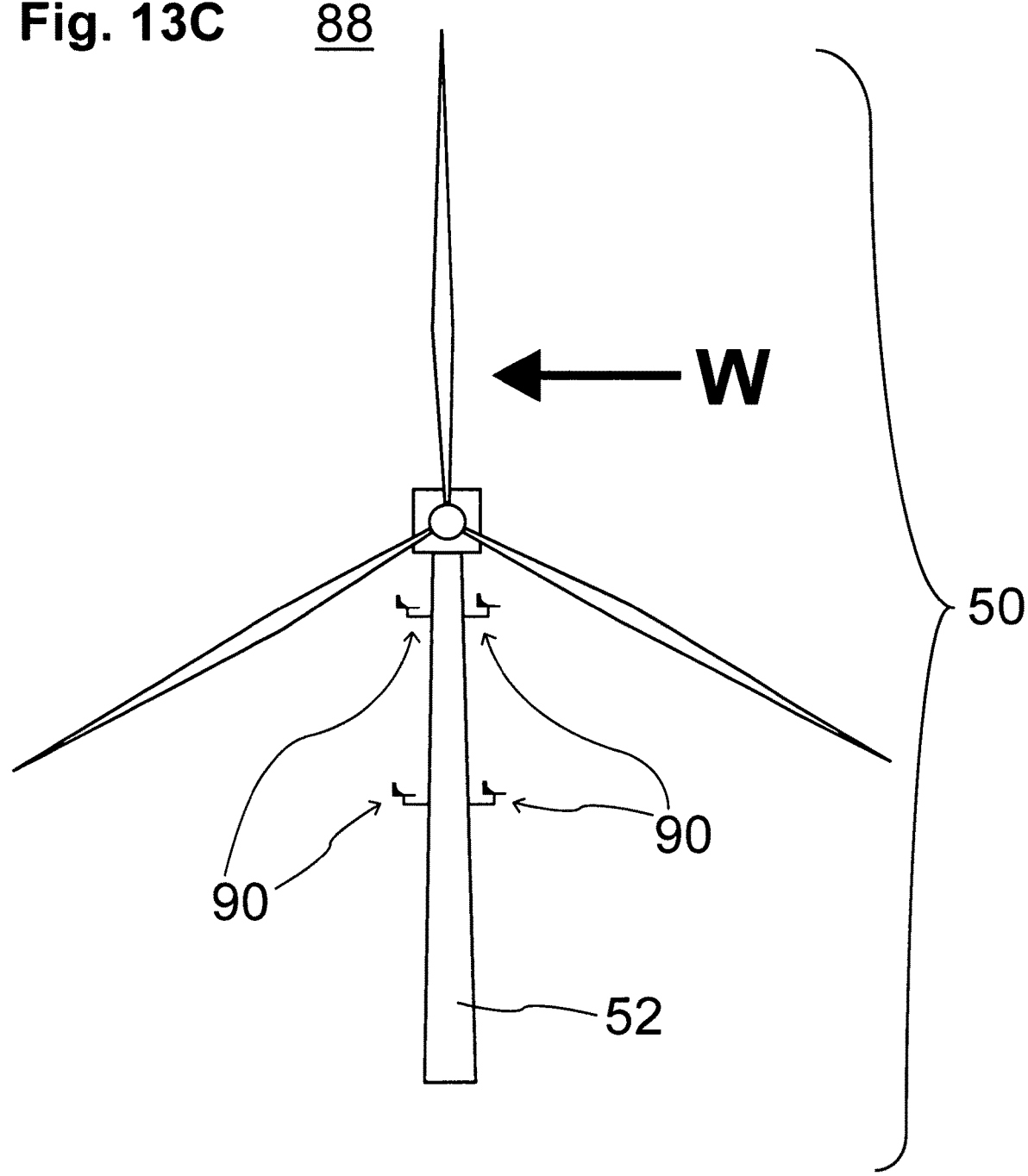

$M_T = M_r + M_t$

ROCKET LAUNCH PLATFORM STABILIZATION SYSTEM

FIELD OF THE INVENTION

One embodiment of the present invention relates to methods and apparatus for providing a floating platform that is stabilized by an autonomous position-correcting system. More particularly, one embodiment of the invention pertains to providing methods and apparatus for an offshore platform that may be used to launch a rocket.

CROSS-REFERENCE TO A RELATED PENDING PATENT APPLICATION & CLAIM FOR PRIORITY

None.

FEDERALLY SPONSORED RESEARCH OR DEVELOPMENT

None.

BACKGROUND OF THE INVENTION

Structures which must be deployed on an offshore platform are subjected to a variety of unwanted forces and torques. Several previous floating structures utilize some form of device that counteract unwanted forces imposed by waves and/or wind.

One industry that is beginning to consider, or to use, offshore floating structures is the rocket launching business. According to *Wikipedia:*

"Sea Launch is a multinational spacecraft launch service that used a mobile maritime launch platform for equatorial launches of commercial payloads on specialized Zenit-3SL rockets through 2014.

By 2014, it had assembled and launched thirty-two rockets, with an additional three failures and one partial failure. All commercial payloads have been communications satellites intended for geostationary transfer orbit with such customers as EchoStar, DirecTV, XM Satellite Radio, PanAmSat, and Thuraya.

The launcher and its payload are assembled on a purpose-built ship Sea Launch Commander in Long Beach, Calif., USA. It is then positioned on top of the self-propelled platform Ocean Odyssey and moved to the equatorial Pacific Ocean for launch, with the Sea Launch Commander serving as command center. The sea-based launch system means the rockets can be fired from the optimum position on Earth's surface, considerably increasing payload capacity and reducing launch costs compared to land-based systems.

Sea Launch mothballed its ships and put operations on long-term hiatus in 2014, following the Russian military intervention in Ukraine. By 2015, discussions on disposition of company assets are underway, and the Sea Launch partners are in a court-administered dispute about unpaid expenses that Boeing claims it incurred. In September 2016, S7 Group, owner of S7 Airlines announced they were purchasing Sea Launch."

Wikipedia also describes:

"L/P Odyssey is a self-propelled semi-submersible mobile spacecraft launch platform converted from a mobile drilling rig in 1997.

The vessel was used by Sea Launch for equatorial Pacific Ocean launches. She works in concert with the assembly and control ship Sea Launch Commander. Her home port is the Port of Long Beach in the United States.

In her current form, Odyssey is 436 feet (133 m) long and about 220 feet (67 m) wide, with an empty draft displacement of 30,000 short tons (27,000 t), and a submerged draft displacement of 50,600 short tons (45,900 t). The vessel has accommodations for 68 crew and launch system personnel, including living, dining, medical and recreation facilities. A large, environmentally-controlled hangar stores the rocket during transit and then rolls it out and erects it prior to fueling and launch."

The *Wall Street Journal* reported that SpaceX landed a rocket booster on a floating platform on 18 Apr. 2018.

Stable provides a platform that eliminate accelerations due to pitch and roll movements of a ship. The movements of the ship are estimated based on sensor signals, and is automatically adjusted by computer controlled actuators.

In U.S. Pat. No. 8,471,396, Roddier et al. describe a floating wind turbine that includes at least three columns that are coupled to each other with horizontal main beams.

Systron Donner Intertial uses high performance gyroscopes and accelerometers to provide a self-contained sensing systems, and provide stabilization for offshore oil rigs, antennas and optical line-of-sight systems.

In U.S. Pat. No. 6,953,308, Horton discloses an elongated, annular hull of a floating offshore platform that includes one or more segmented, helical stakes disposed on an outer peripheral surface of the hull to reduce vortex-induced vibrations resulting from water currents.

Pratt describes three leading prototype designs for floating offshore wind platforms in his article entitled *Floating Wind Turbines.*

Tens of thousands of wind turbines are used to generate electricity throughout the world ranging in size from a few kilowatts to up to ten megawatts. Of these, horizontal axis wind turbines are the most common. These turbines capture the kinetic energy in air flow through a circular cross-section; concentric rotors are driven by wind. The overwhelming majority of wind turbines have been built on land, where they can be secured to the ground through a variety of means.

While still comprising a small share of the overall market to date, several thousand offshore wind turbines have been installed—primarily in Europe and China. The first offshore wind turbines in the United States were installed in 2016. Until late 2017, all commercial offshore wind turbines were rigidly affixed to the sea bed, and in relatively shallow (less than 50 meters) ocean water. Such shallow ocean space is a finite commodity relative to the open ocean that has an average depth of roughly 12,000 feet.

In October 2017, the first commercial floating offshore wind turbines came online off the northeast coast of England. This installation consists of five wind turbine units each of provide six MegaWatts (MW) of power, and which are mounted on large steel spar buoys, for a total generation capacity of 30 MW. These spars take the shape of cylinders with 14 meter diameters and a length of 90 meters. Each spar weights approximately 5,000 tons, and is filled with 2,500 tons of iron ore ballast.

The development of a system that enables the operation of autonomous self-correcting platforms for offshore use would be a major technological advance, and would satisfy long-felt needs in the construction industry.

SUMMARY OF THE INVENTION

One embodiment of the present invention includes methods and apparatus for providing a autonomously stabilizing floating platform or structure. One embodiment of the invention includes an assembly of fully-submerged co-centric air chambers that may accept varying amounts of air in order to produce a counter torque (moment of inertia) to the large overturn moment generated by the wind acting on a structure that is used to launch a rocket. In one embodiment, an underwater assembly is coupled to a structural frame that is connected to the turbine tower above water. One embodiment of the invention has a statically buoyant chamber to provide redundant means of floating. Various embodiments of the invention include, but are not limited to, stabilized floating platforms for rocket launches, buildings, bridges, islands, and wind turbines.

An appreciation of the other aims and objectives of the present invention, and a more complete and comprehensive understanding of this invention, may be obtained by studying the following description of a preferred embodiment, and by referring to the accompanying drawings.

A BRIEF DESCRIPTION OF THE DRAWINGS

FIG. 1 is a schematic diagram which shows a rocket and a support tower mounted atop one embodiment of the present invention.

FIG. 2 provides a schematic diagram which shows an office building mounted atop one embodiment of the present invention.

FIG. 3 supplies a schematic diagram which shows an structural support system which may be used in conjunction with the office building shown in FIG. 2.

FIG. 4 furnishes a view of the building shown in FIG. 2 combined with the support structure shown in FIG. 3.

FIG. 5 offers additional details of one embodiment of a statically buoyant chamber.

Figure 8:
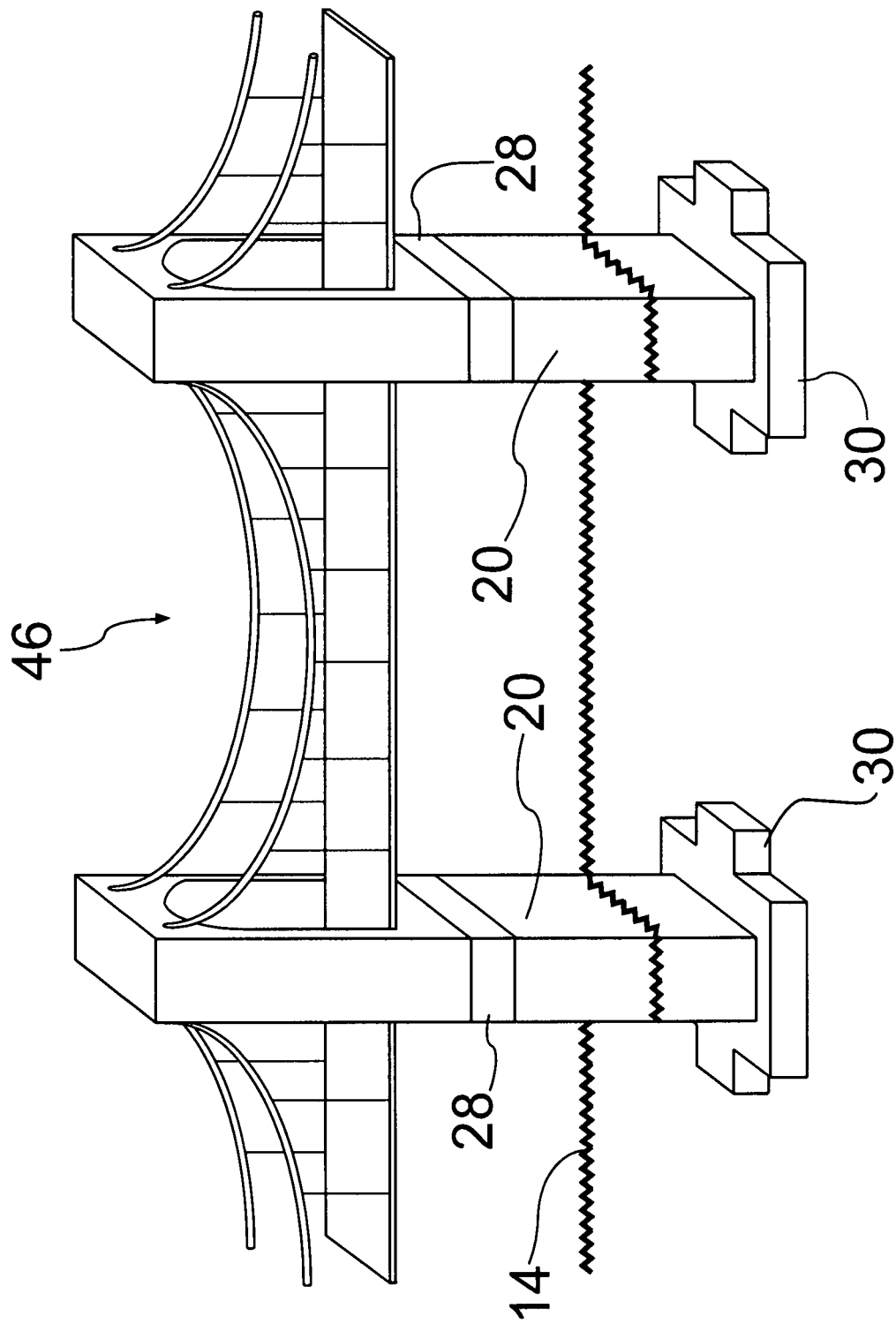

FIG. 8 supplies a schematic view of one embodiment of the present invention which is used in combination with a wind turbine.

Figure 9:
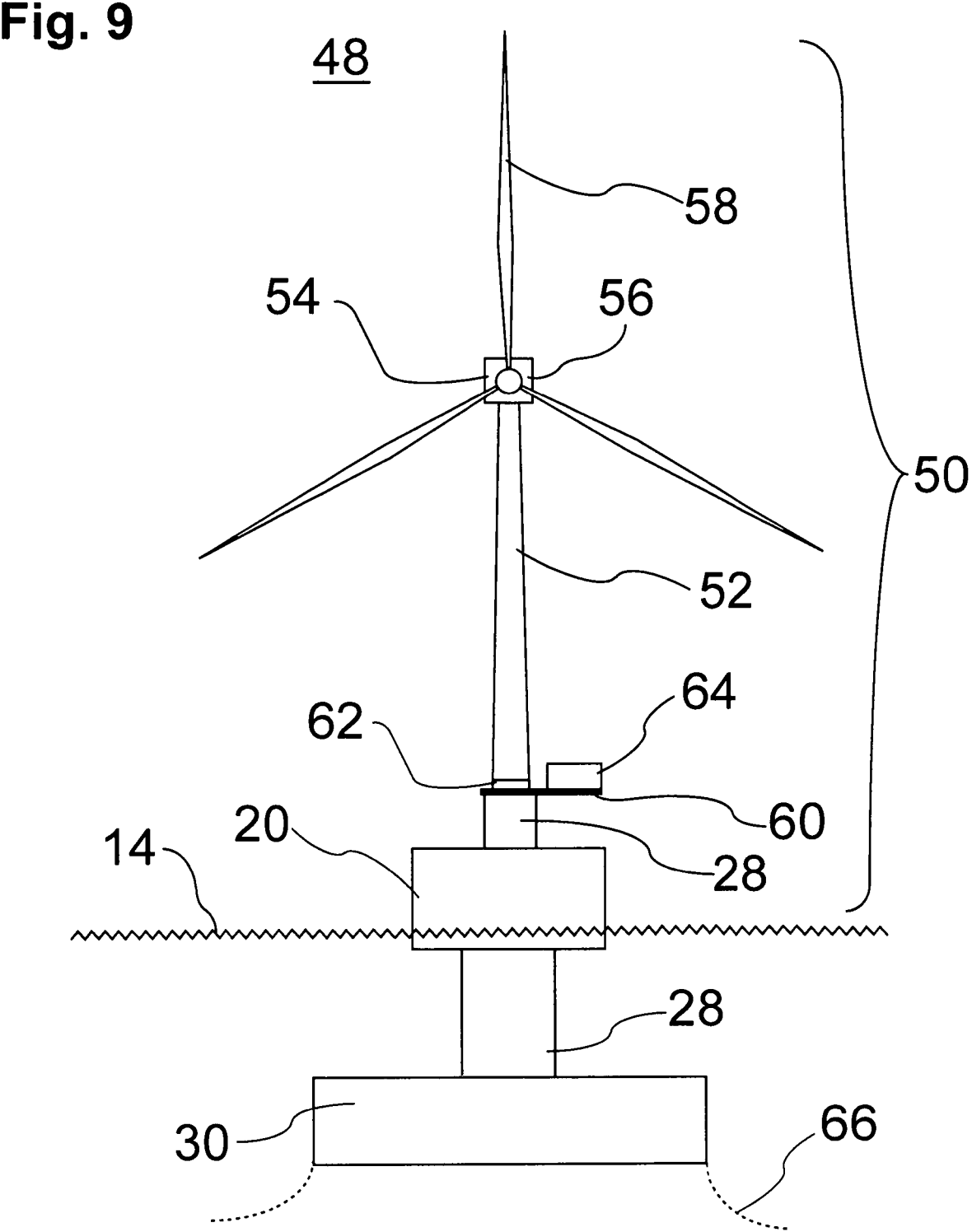

FIG. 9 furnishes a schematic view of the details of the embodiment shown in FIG. 8.

Figure 10:
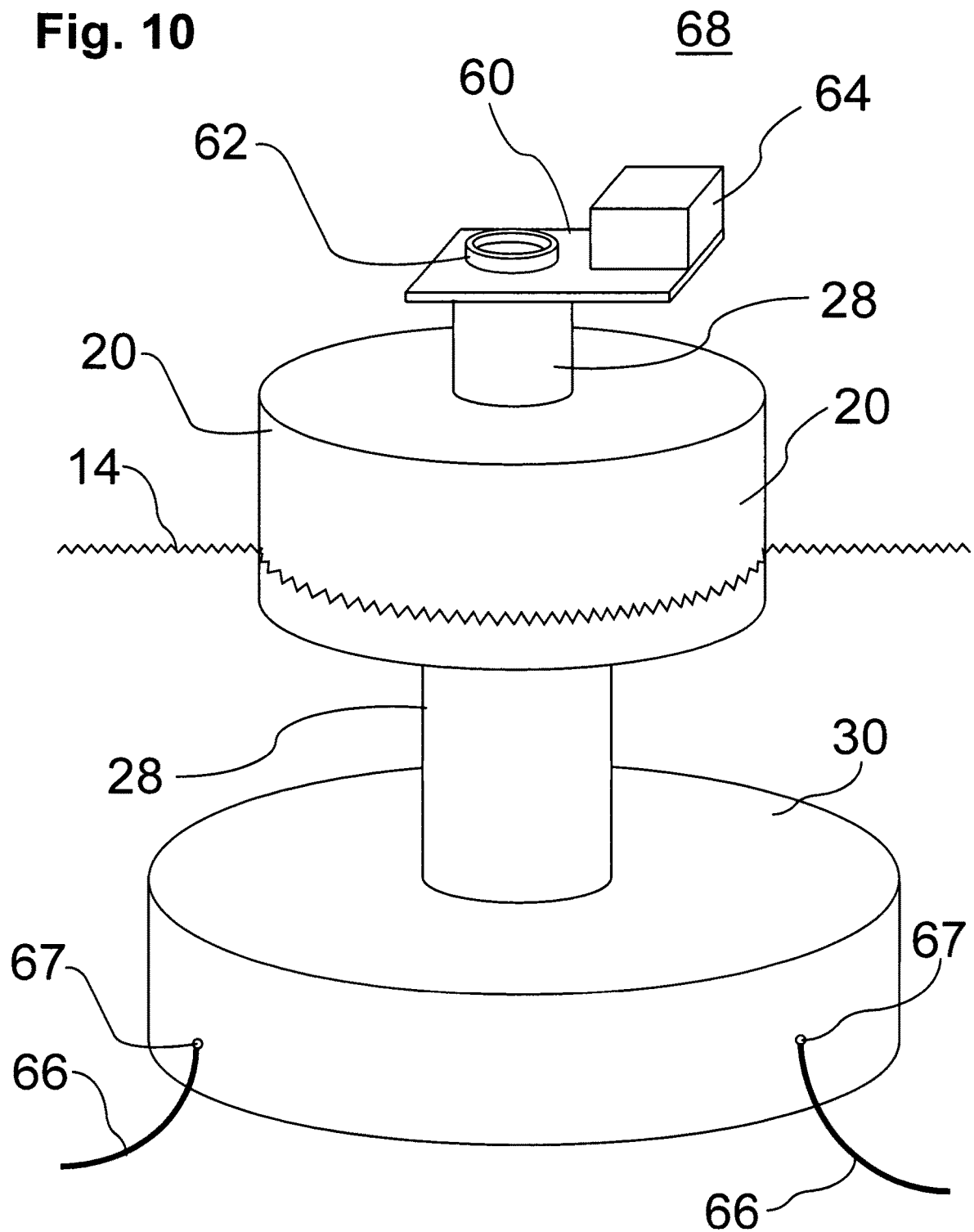

FIG. 10 is a schematic view which depicts the details of the embodiment of a statistically buoyant chamber.

Figure 11:
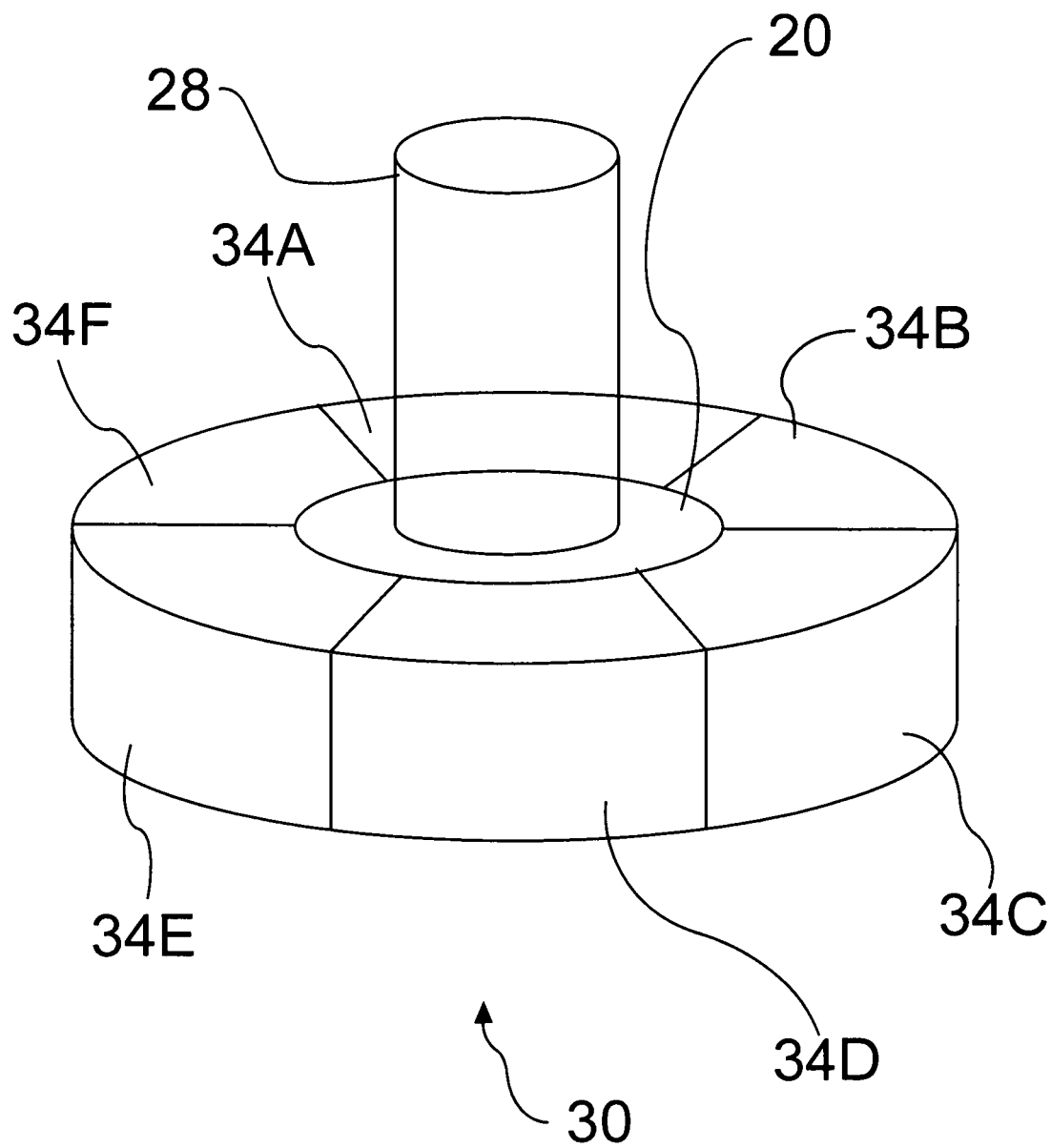

FIG. 11 offers a schematic view of one embodiment of the present invention which includes an air control system and air ducts.

Figure 12:
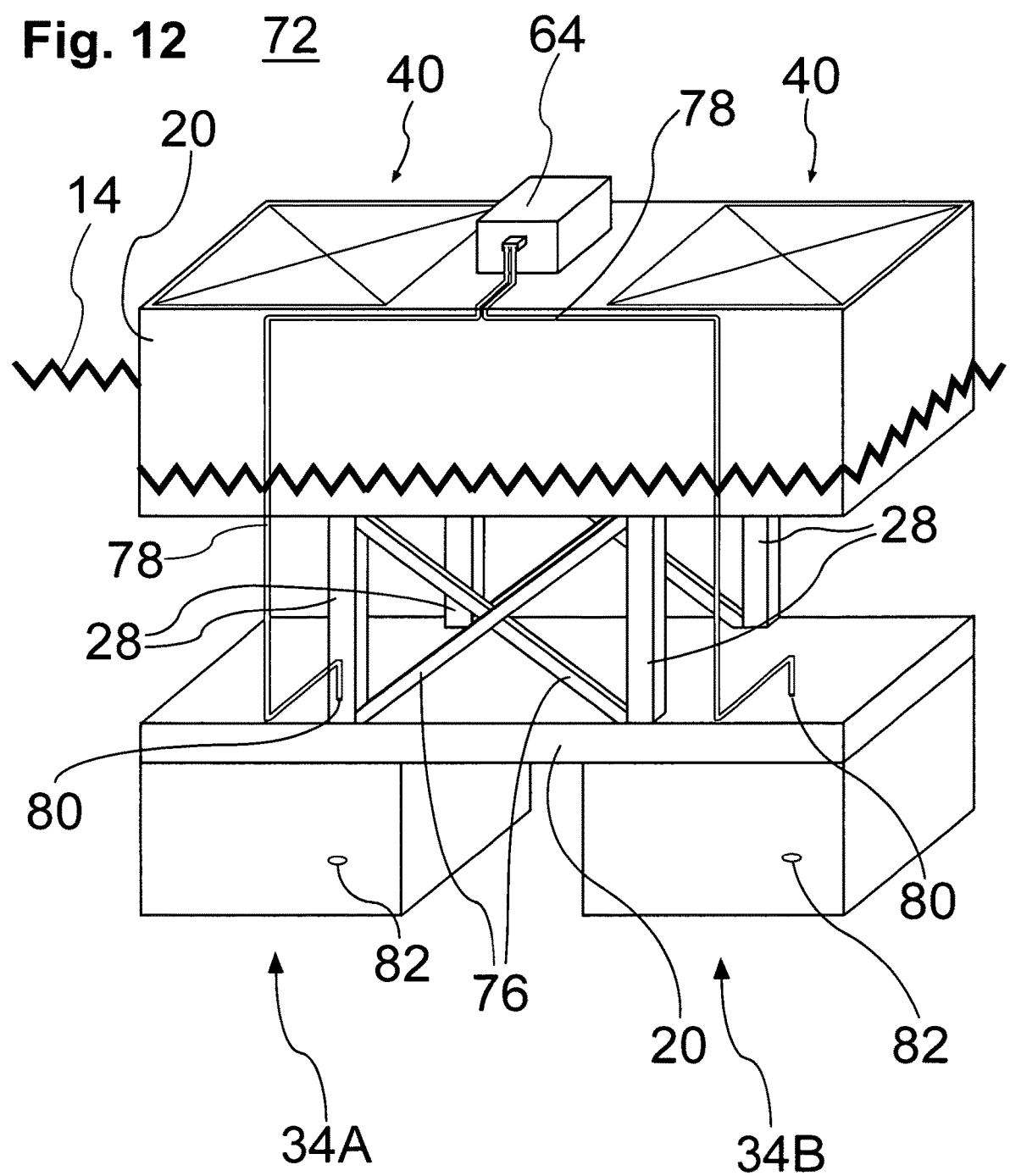

FIG. 12 is another schematic diagram which shows weight loads on a functional platform.

Figure 13:
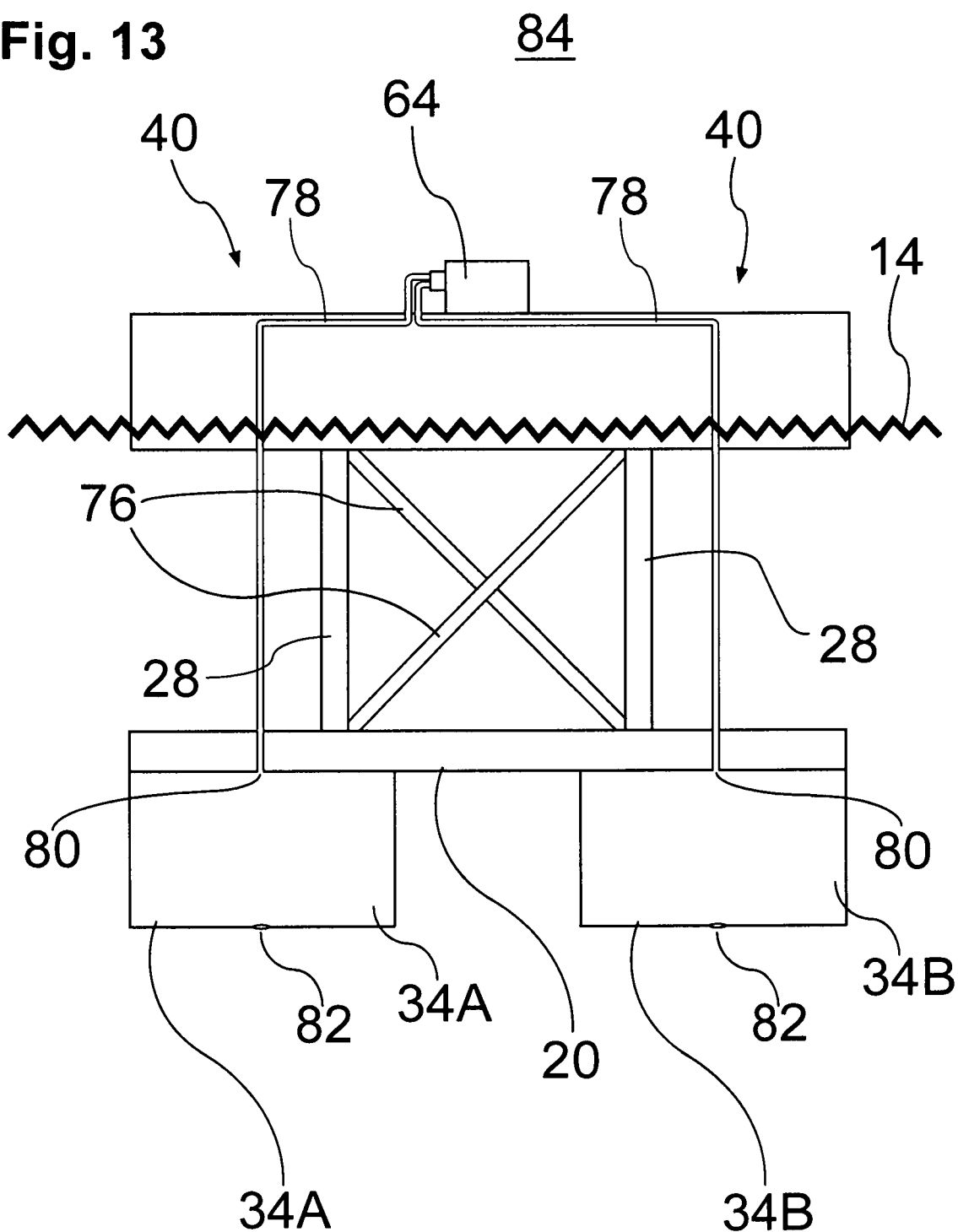

FIG. 13 provides yet another schematic view that illustrates how one embodiment of the present invention creates counteracting forces based on weight loading.

FIGS. 13A through 13G explain the operation of one embodiment of the present invention.

Figure 14:
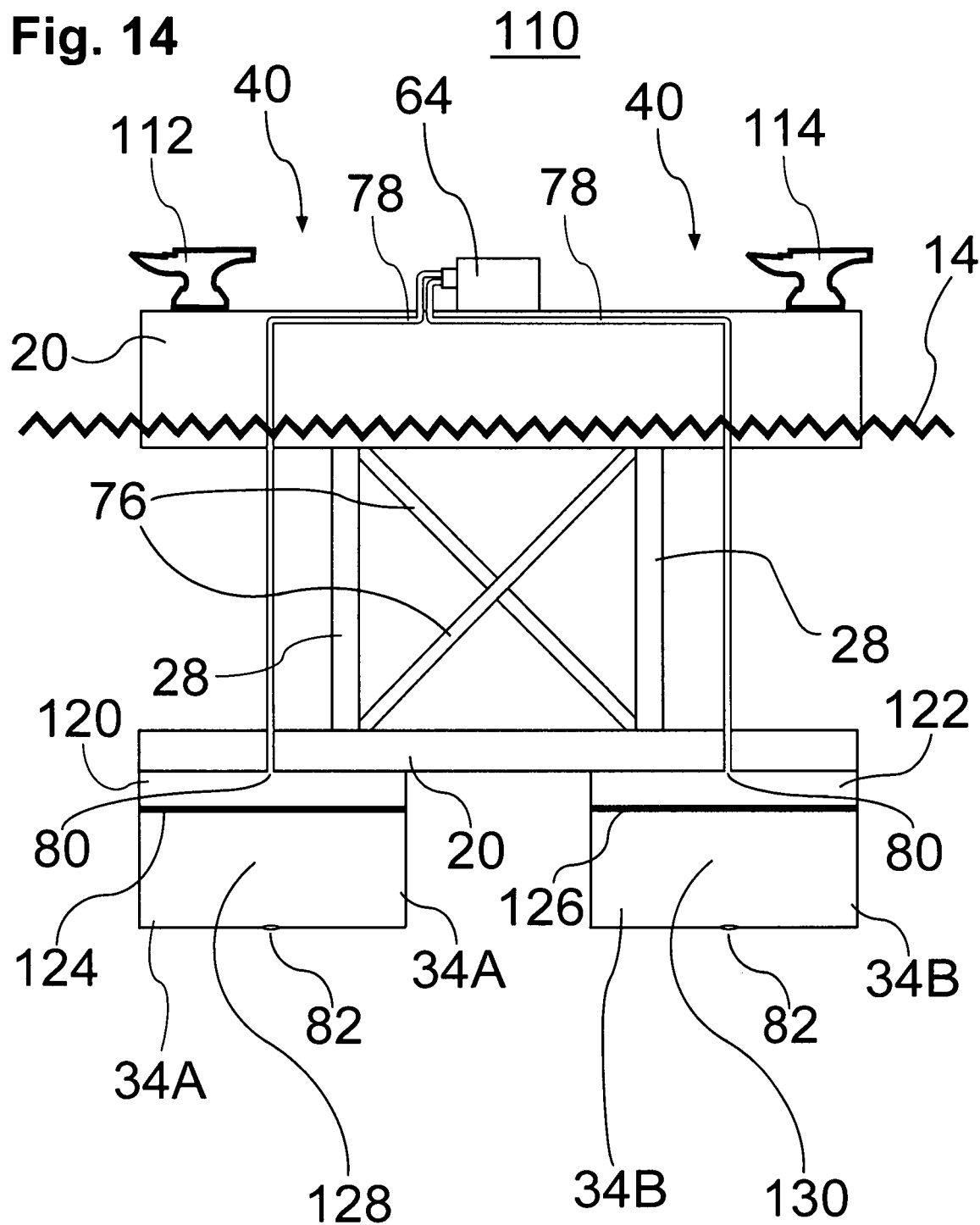

FIG. 14 furnishes yet another schematic diagram which shows how pressurized air levels within variable buoyancy-generating chambers change as forces on the platform change.

Figure 15:
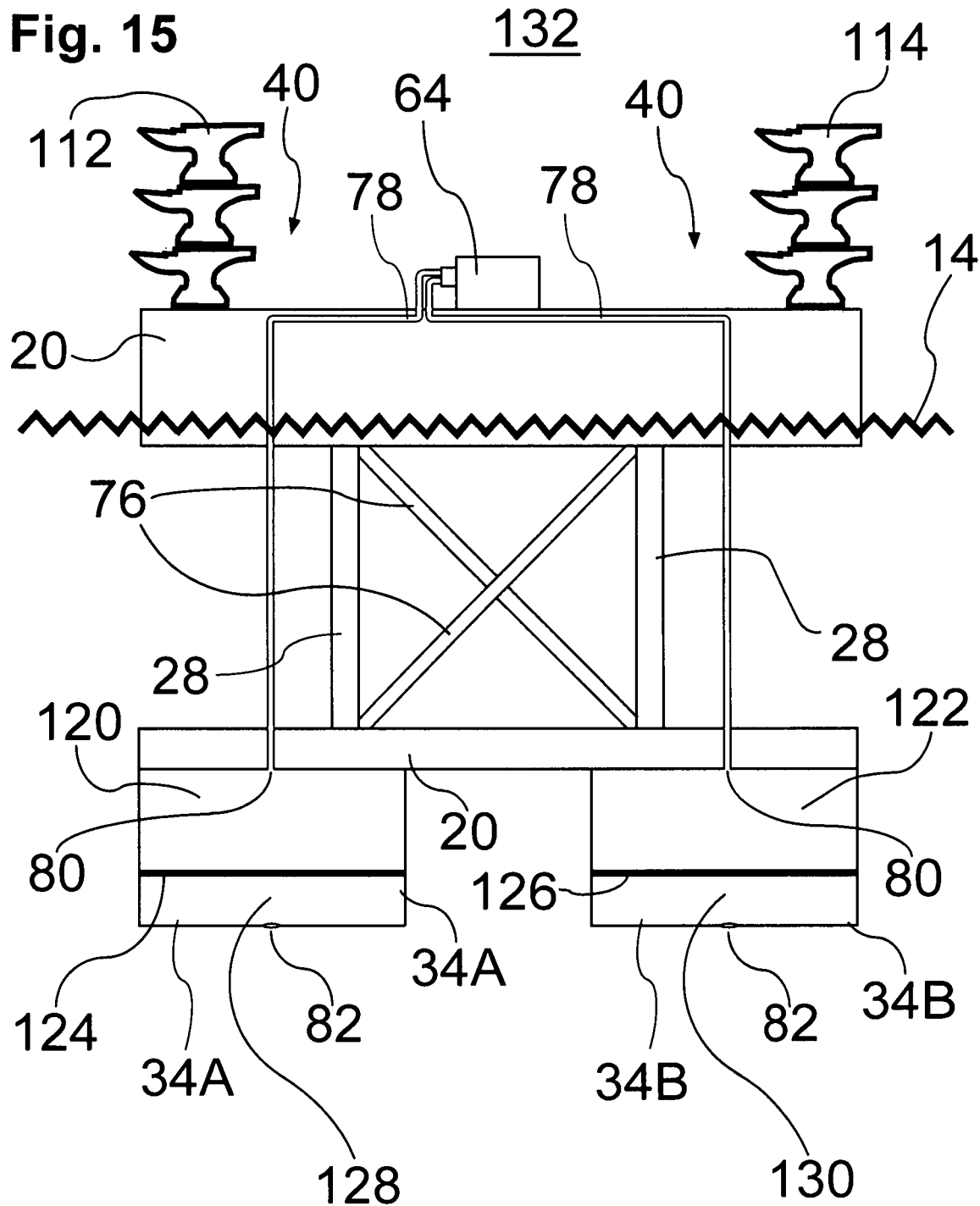

FIG. 15 offers another schematic view of one embodiment of elements which provide counteracting forces to offset natural forces that change the proper orientation of a structure.

Figure 16:
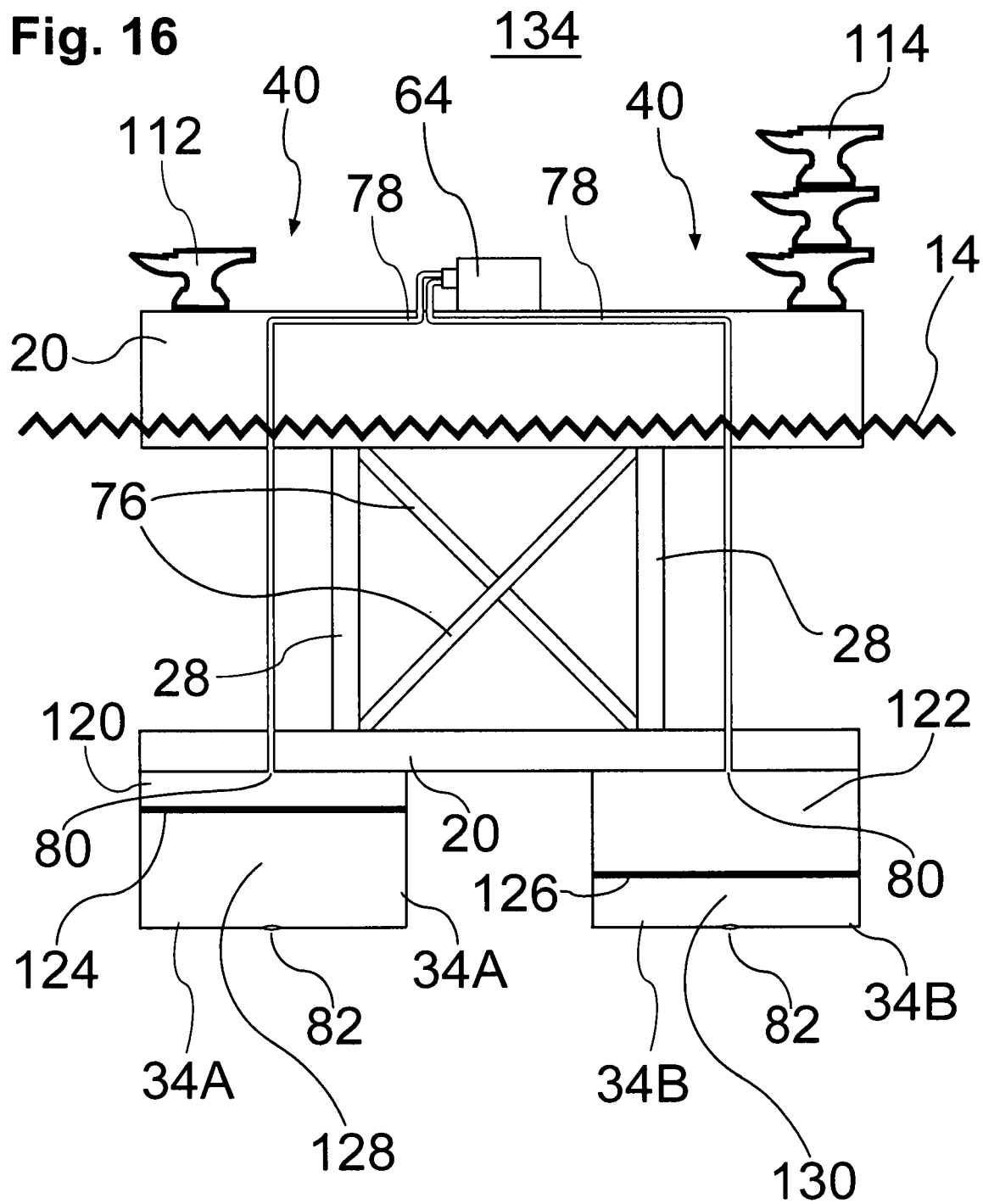

FIG. 16 is another schematic illustration that depicts changing levels in the pressurized chambers.

Figure 17:
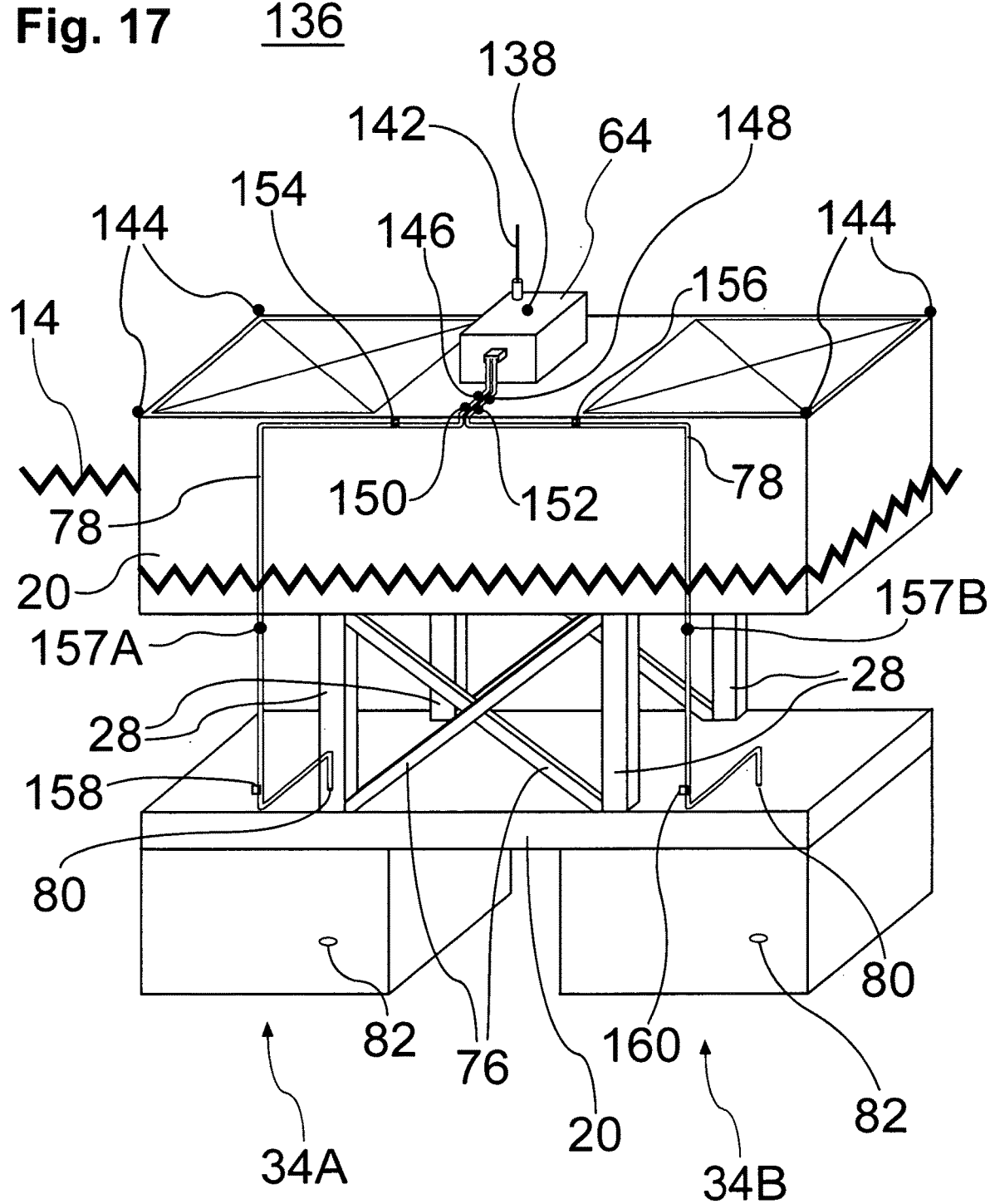

FIG. 17 is a schematic view of one embodiment of the invention, which includes a gyroscope, an antenna, an air control system, sensors and valves.

Figure 18:
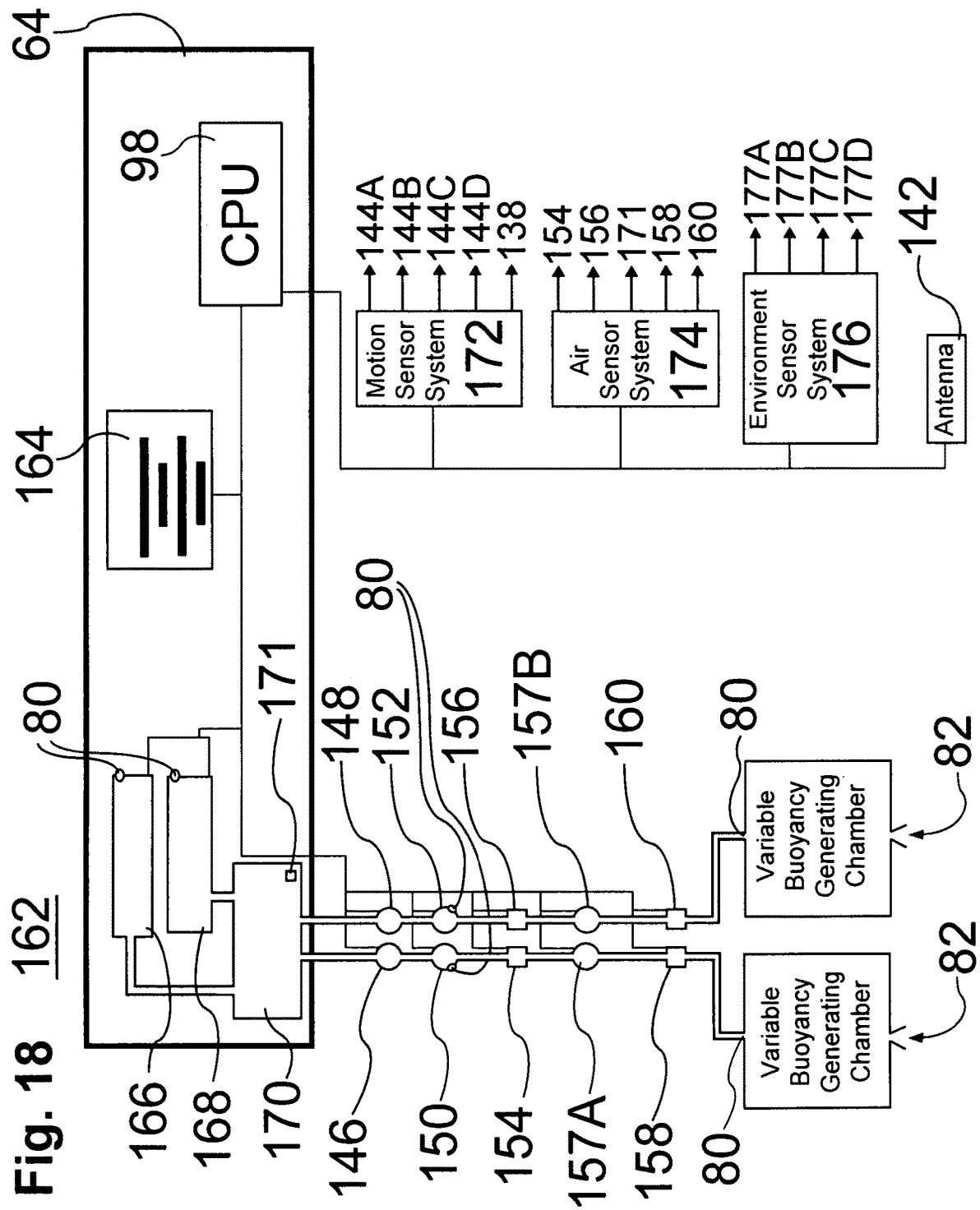

FIG. 18 is a schematic diagram which illustrates the elements of one embodiment of the invention which produce counter-acting forces on the platform.

Figure 19:
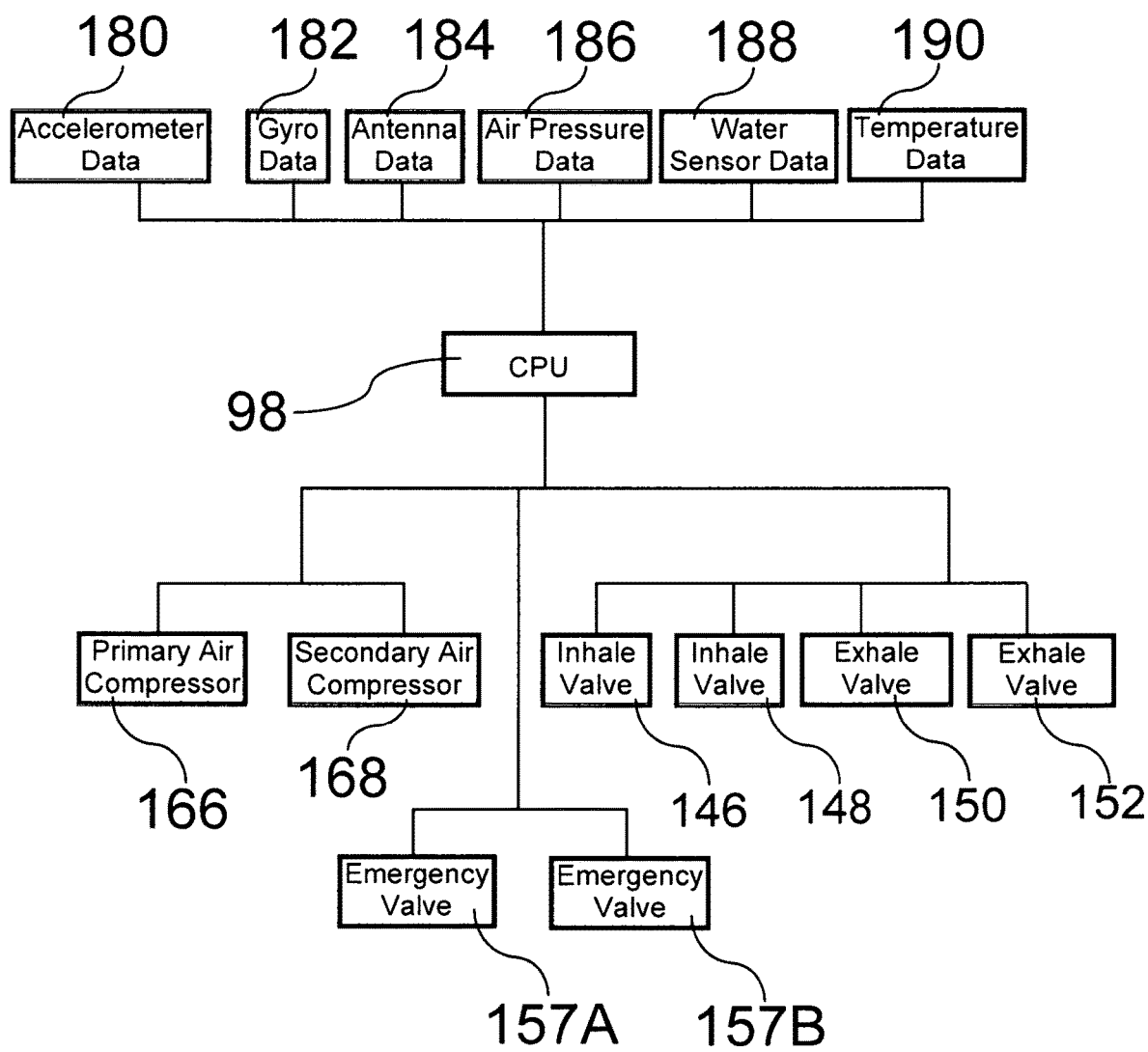

FIG. 19 is another schematic diagram which provides a more detailed view of the CPU and the elements connected to it which supply the counter-acting forces on the platform.

A DETAILED DESCRIPTION OF PREFERRED & ALTERNATIVE EMBODIMENTS

I. A Description of Various Embodiments of the Invention

A. The Rocket Launch Industry

The website cosmoquest predicts that between 120 and 150 rocket launches will take place in the year 2018.

SpaceX is a privately held company with over seven thousand employees, and provides orbital rocket launches to both the government and to private customers. According to *Wikipedia*, th SpaceX BFR rocket will be 348 feet tall, and will weigh 9,700,000 pounds. The BFR rocket will produce 52.7 MN, or 11,800,000 lbf of thrust.

Most government require that rockets be launched over the ocean. In addition, rockets which are launched at or near the Equator obtain the benefit of greater angular velocity due to the rotation of the Earth. For these, as well as other reasons, the prospect of launching rockets from floating offshore platforms presents many advantages.

Figure 1:
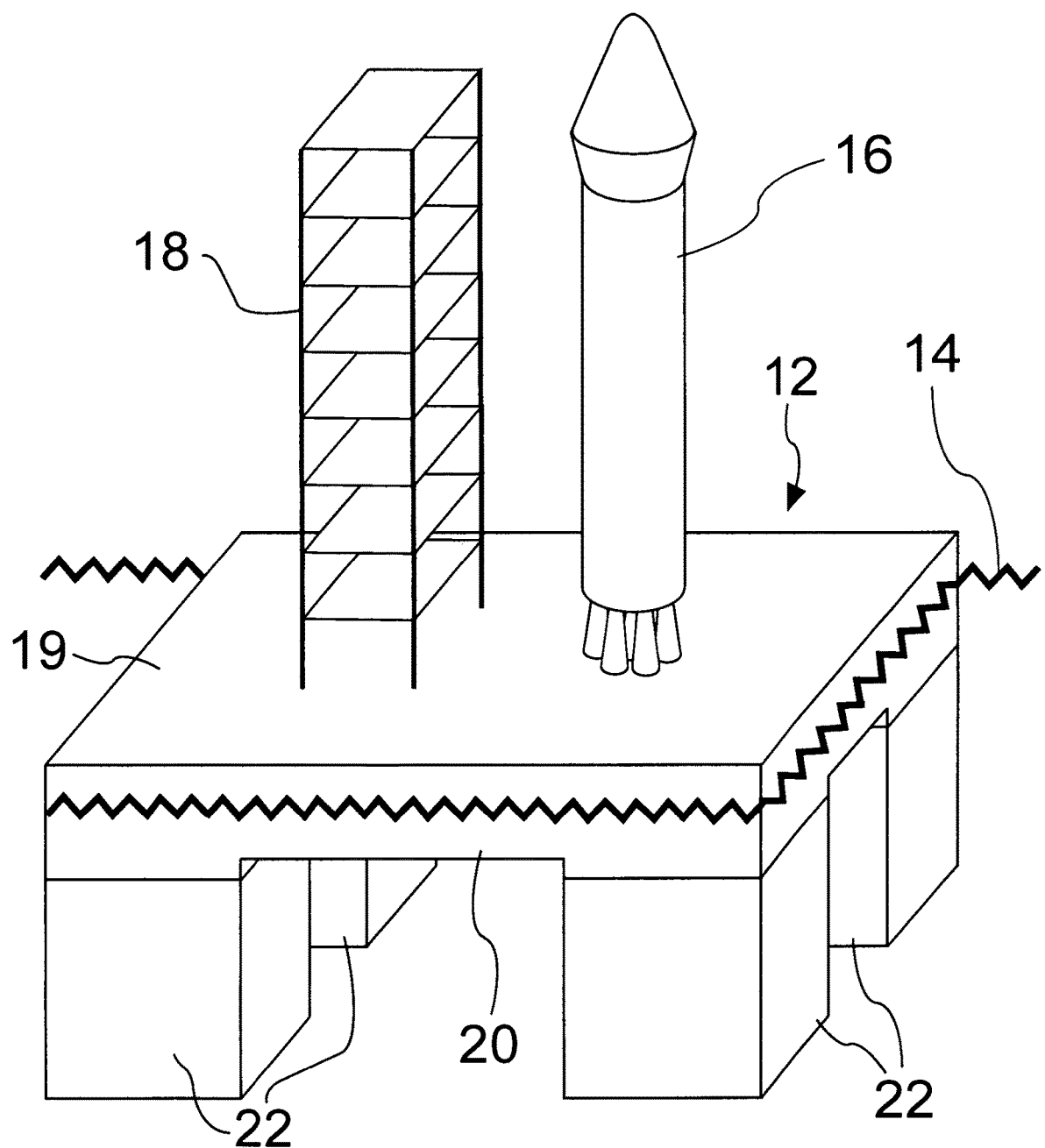

FIG. 1 reveals a schematic view of one embodiment 10 of the present invention, which is used as an offshore floating rocket launch platform 12, or other suitable structure 12. The platform 12 floats on the surface of a body of water 14. A rocket 16 and a rocket launch support tower 18 are shown on the top surface 19 of the platform 12 in preparation for launch.

In one embodiment, the platform or structure 12 includes a statically buoyant chamber 20 and more than one variable buoyancy-generating chambers 22. In this embodiment, these chambers 22 are generally rectilinear. Unlike the statically buoyant chamber 20, the variable buoying-generating chambers 22 are capable of being pressurized with a fluid to provide counter-acting forces that compensate for position changes incurred by natural forces.

The various embodiments of the invention are configured so that they each contain volumes of a fluid which is lighter than water. In most embodiments, the fluid is air. The platform 12 or structure contains chambers which are both statically buoyant and dynamically buoyant so that the forces of buoyancy exceed the force of gravity, and the platform 12 floats in the water.

The details of the apparatus that senses, measures and responds to natural forces in described in detailed in subsequent sections of this Specification.

Figure 2:
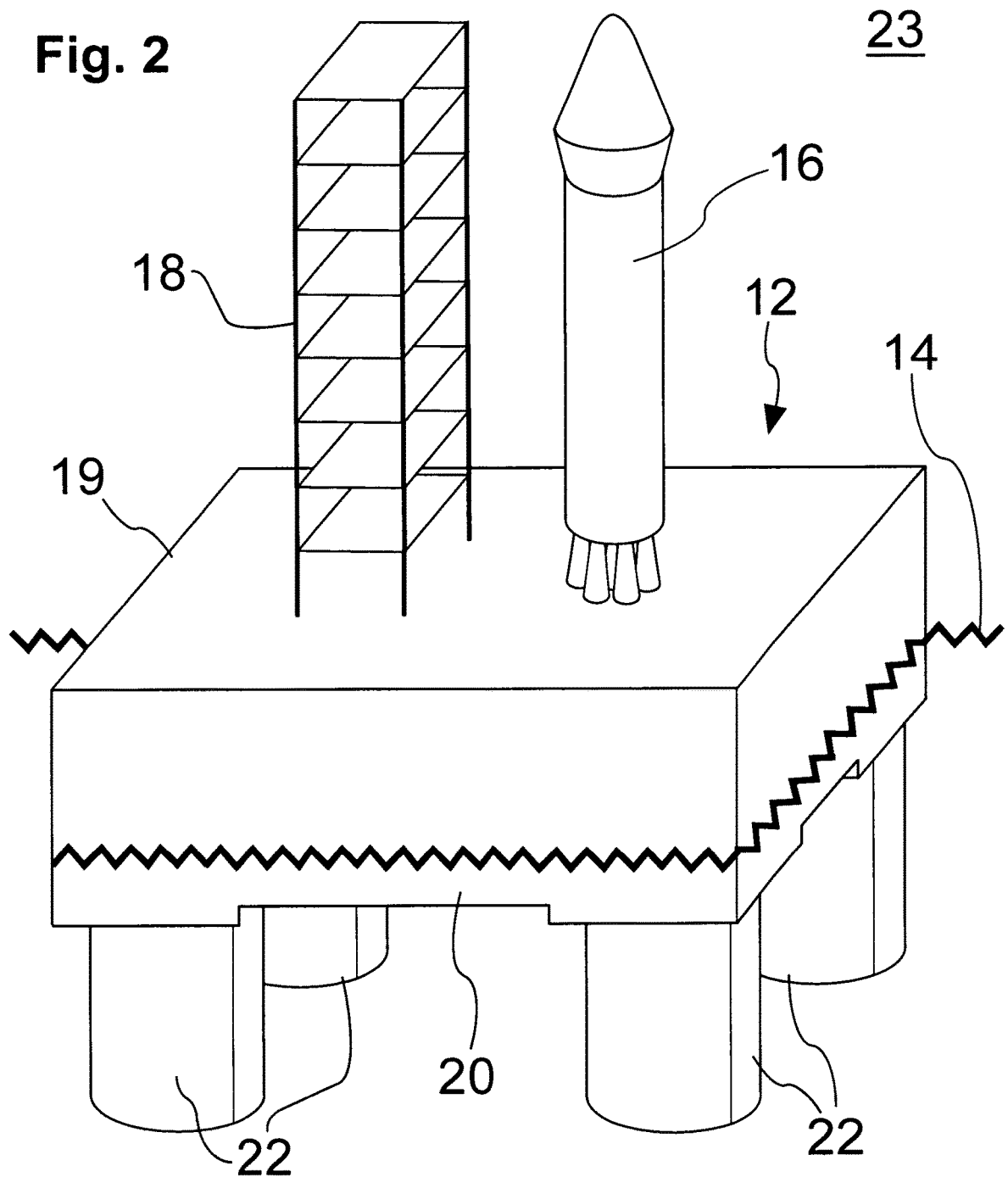

FIG. 2 presents another schematic view of another embodiment 23, which includes variable buoyancy-generating chambers 22 that are generally circular in cross-section.

Figure 3:
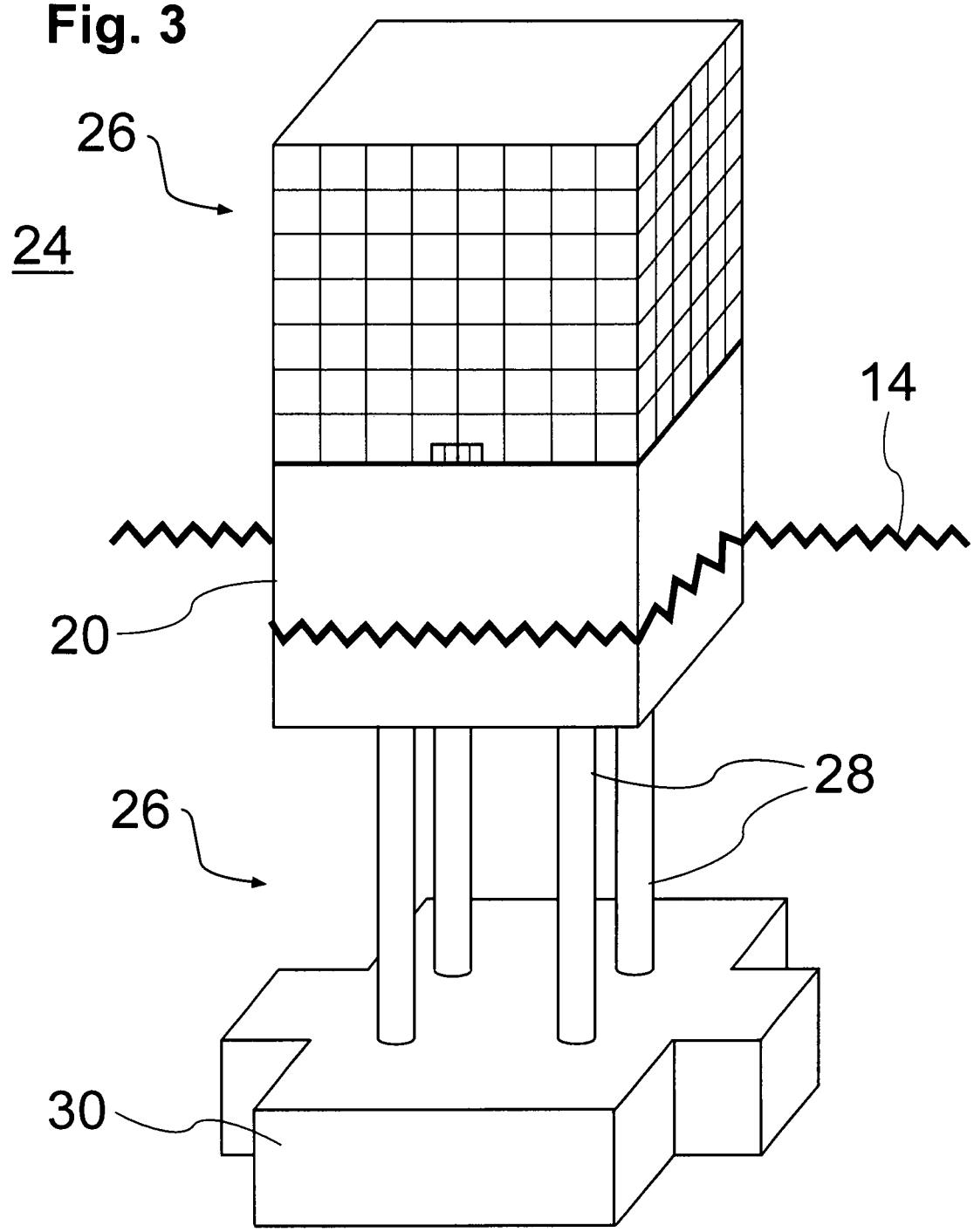

FIG. 3 offers a schematic view of another embodiment 24 of the invention, which provides a floating platform for a building 26. The building 26 may be used as office space, a residence or any other suitable purpose. The building shown in FIG. 3 is connected to a structural support assembly 26, which includes four structural supports 28.

The structural supports 28 are embedded in a variable buoyancy-generating chamber assembly 30.

Figure 4:
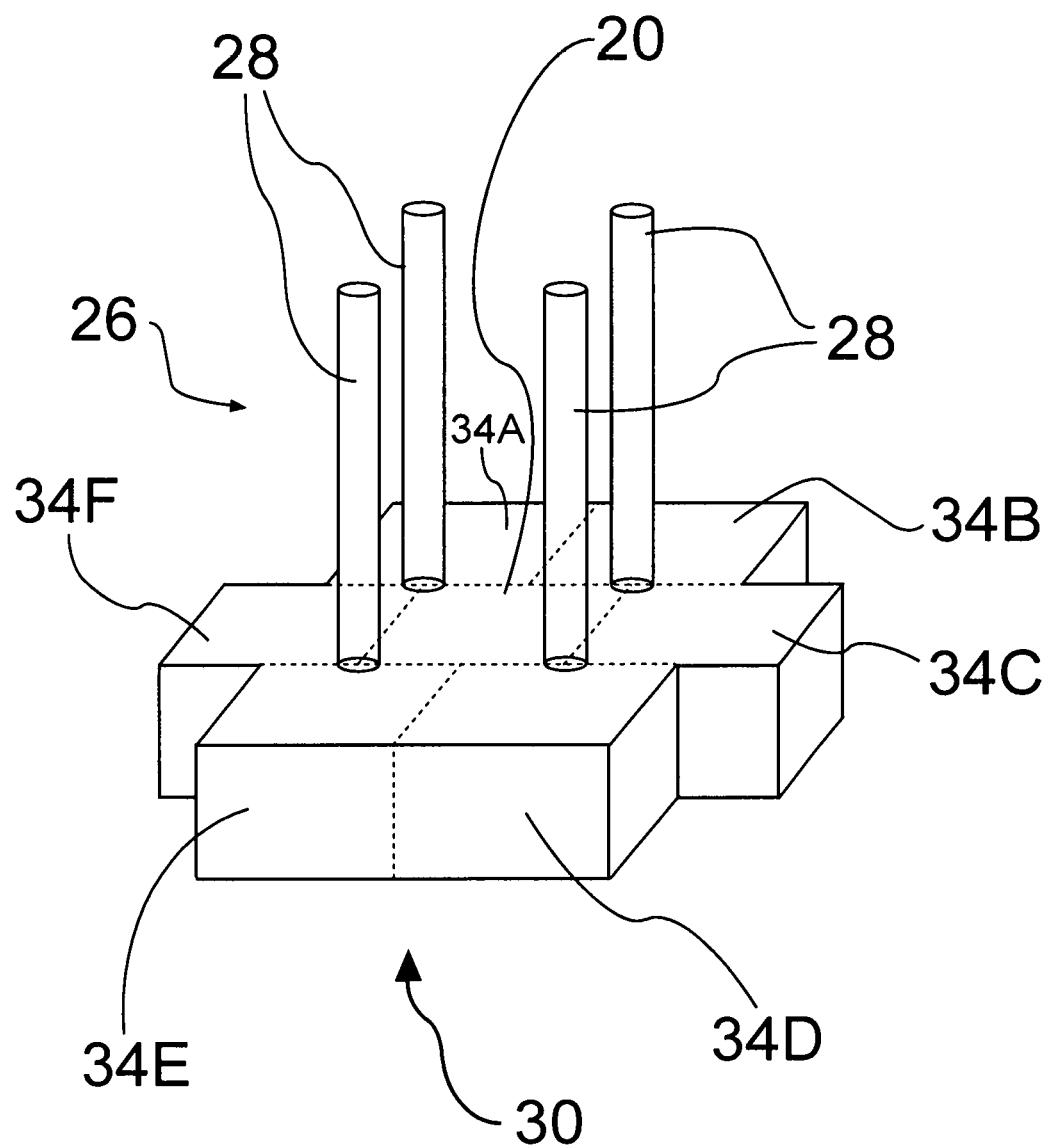

FIG. 4 is a schematic illustration 32 which provides additional details of the apparatus shown in FIG. 3. The variable buoyancy-generating chamber assembly 30 includes a statically buoyant chamber 20 which is surrounded by more than one variable buoyancy-generating chambers 34A, 34B, 34C, 34D, 34E and 34F. In several of the Figures that follow, only chambers 34A and 34B are described, simply for the sake of clarity. Various embodiments of the invention may be configured with any multiple number of chambers.

B. Buildings, Bridges & Other Structures

Figure 5:
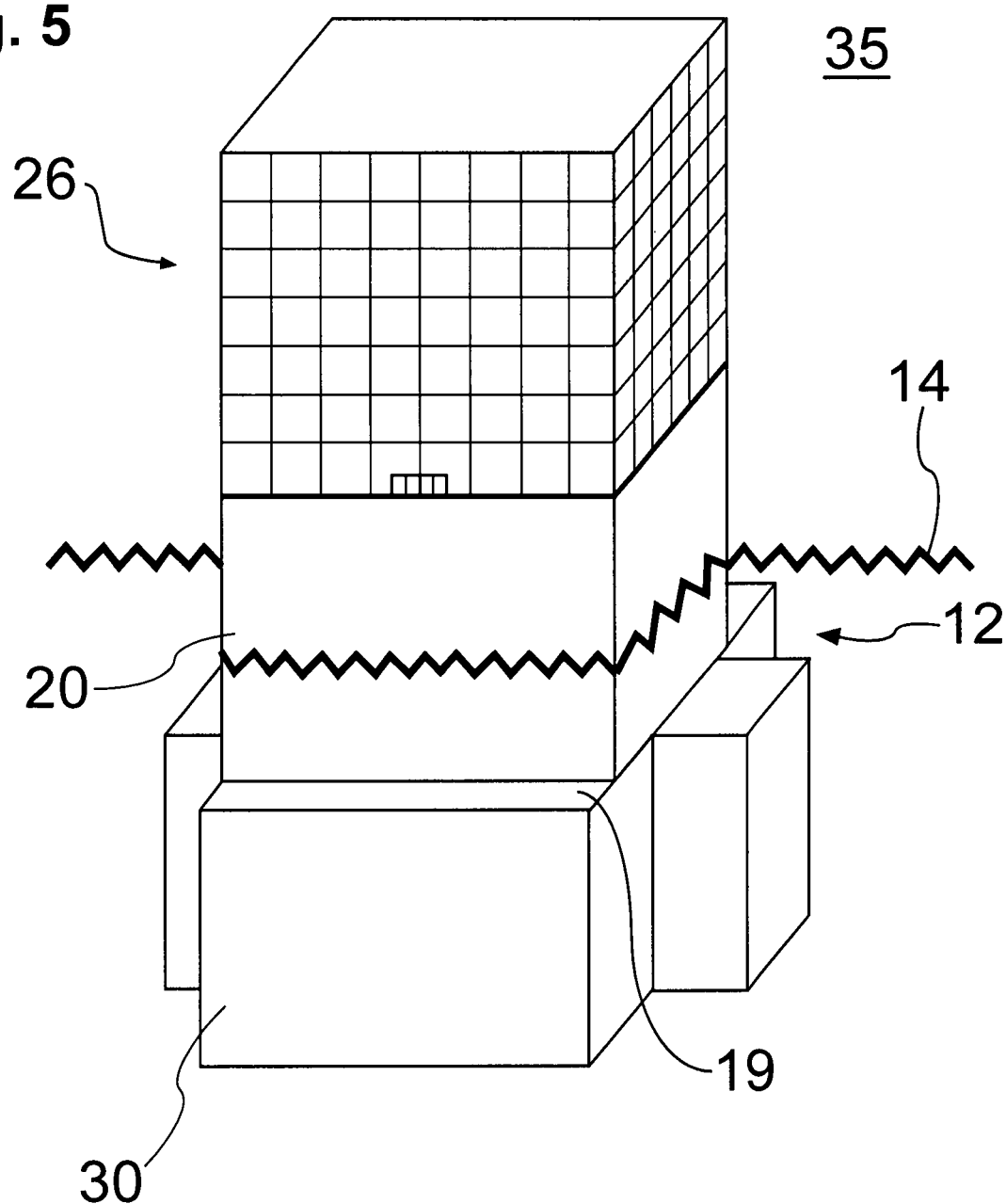

FIG. 5 offers another schematic view 35 which depicts an alternative implementation of the invention for a building 16. In this version, the building 16 resides directly upon the top surface 19 of the platform 12.

Figure 6:
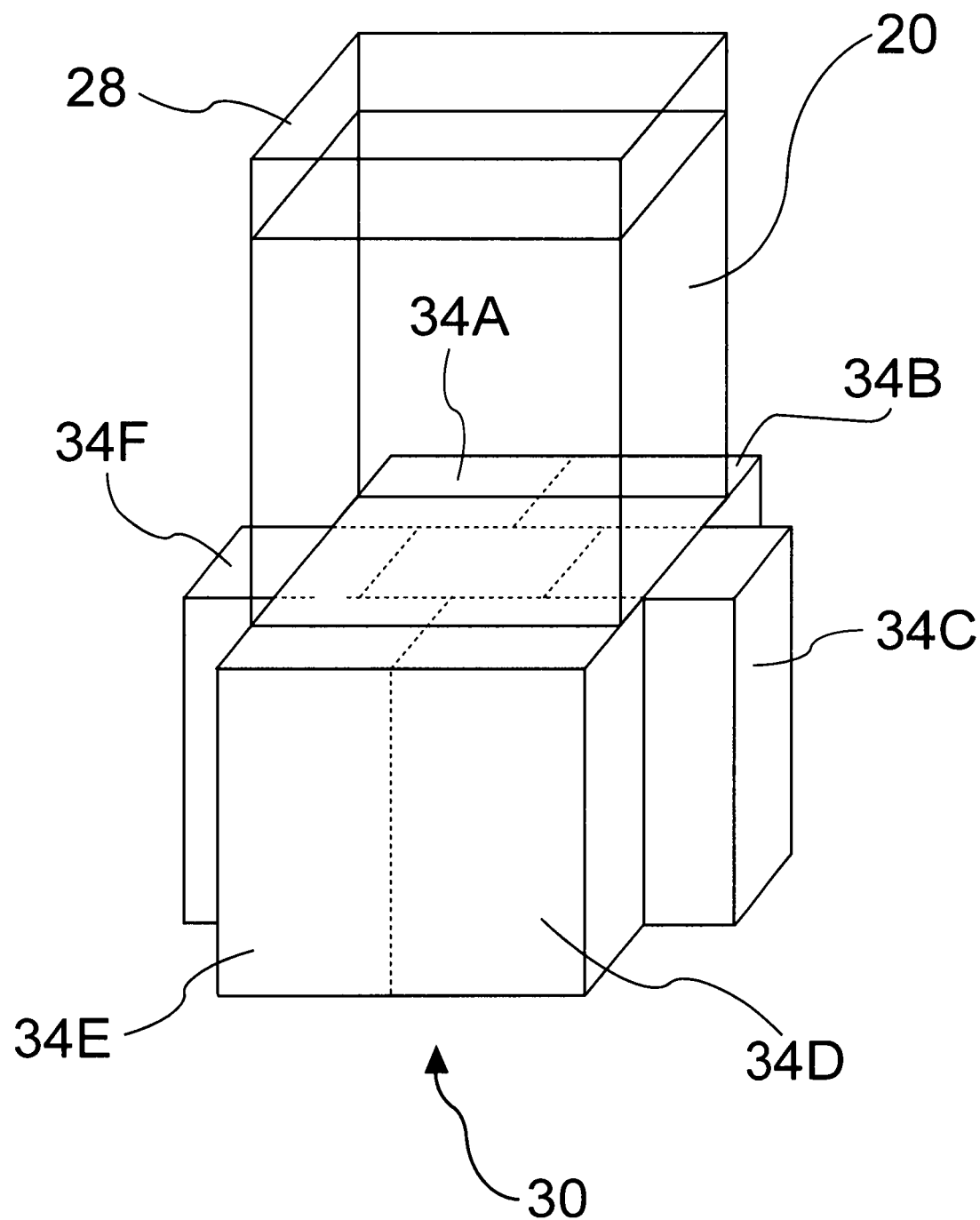
FIG. 6 is a schematic view of one embodiment of the invention which may be used to build an artificial floating island.

FIG. 6 supplies another variation 36 of the building embodiment of the present invention. This embodiment employs a structural support 28 which is located on the top of the variable buoyancy-generating chambers 34A through 34F.

Figure 7:
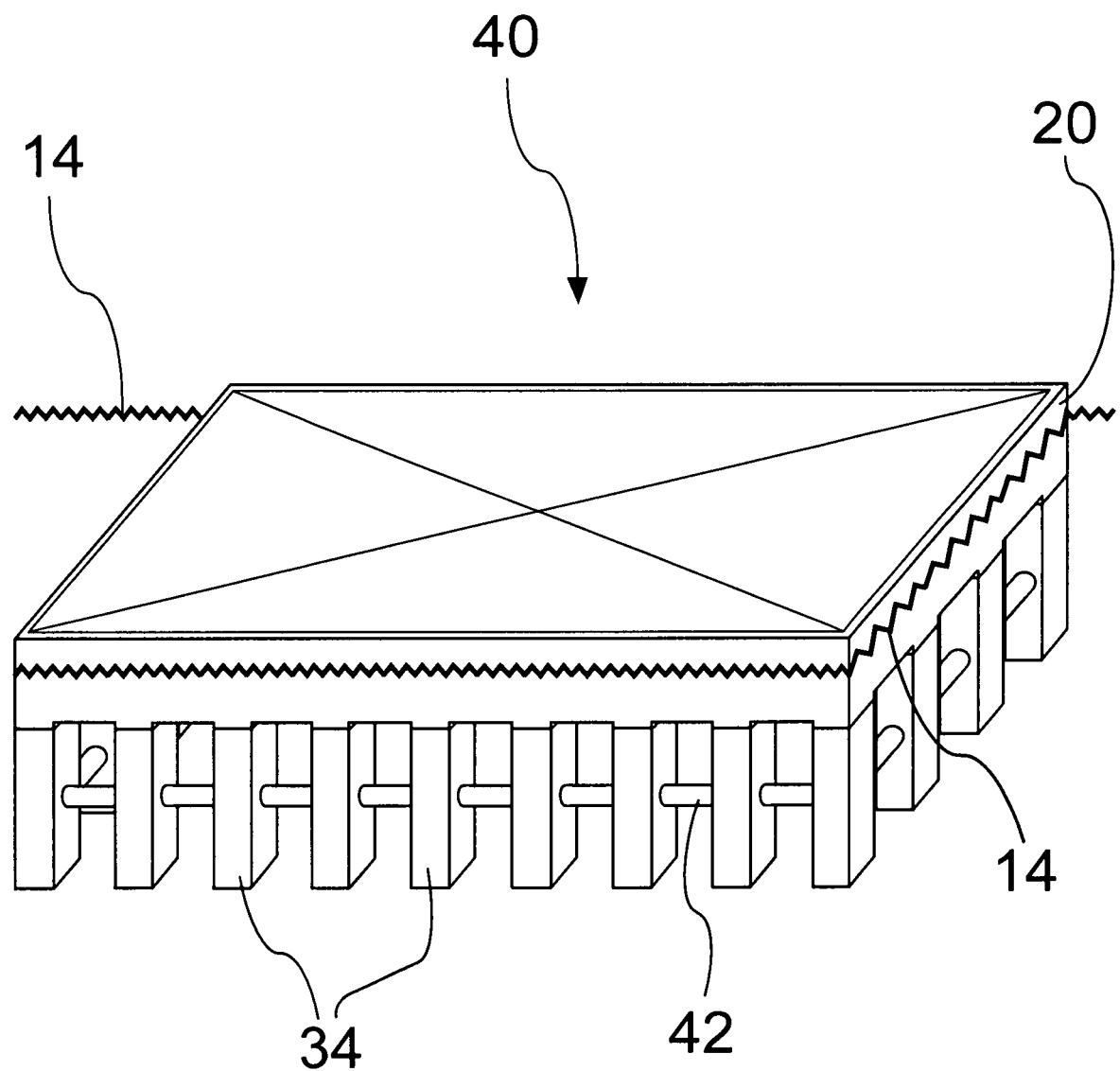
FIG. 7 is a schematic view of one embodiment of the invention which may be used to build a floating bridge.

FIG. 7 furnishes a schematic view 38 of another portion of the present invention. A functional loading area 40 is shown atop a statically buoyant chamber 20. A number of variable buoyancy-generating chambers 34 are shown below the water line 13, connected by horizontal structural supports 42.

FIG. 8 supplies yet another embodiment 44 of the present invention, which may be utilized as part of a bridge 46. The bridge 46 depicted in FIG. 8 is a suspension bridge. Alternative embodiments may be used in combination with other bridge designs.

C. Wind Turbine Platforms

Another embodiment 48 of the invention is used to support an offshore wind turbine 50, as shown in FIG. 9. The turbine 50 includes a turbine tower 52 which has a nacelle 54 attached at the top of, the tower 52. The nacelle 54 houses a rotor rub 56. The rotor hub 56 is attached to a number of rotor blades 58. When wind impinges on the rotor blades 58, their curved surfaces create forces which cause them to rotate.

The turbine tower 52 is affixed to a turbine tower connection 62 and to a maintenance platform 60. An air control system 64 is mounted on the maintenance platform 60.

A structural support 28 extends down below the water line beneath the tower 52, and terminates in a statically buoyant chamber 20. Another structural support 28 extends downward below the statically buoyant chamber 20, and terminates in a variable buoyancy-generating chamber assembly 30. A cable tether 66 is connected to the variable buoyancy-generating chamber assembly 30 at a point of attachment 67.

FIG. 10 supplies a schematic depiction 68 of the features of the embodiment shown in FIG. 9, but from a different perspective view. The turbine tower connection 62 extends up through the maintenance platform 60. The air control system 64 is shown on the top of the maintenance platform 60.

The structural support 28 extends down below the water line beneath the tower 52, and terminates in the statically buoyant chamber 20. Another structural support 28 extends downward below the statically buoyant chamber 20, and terminates in the variable buoyancy-generating chamber assembly 30.

FIG. 11 furnishes a view 70 which reveals more details of the embodiment shown in FIG. 10. The structural support 28 extends upward from the statically buoyant chamber 20, and is surrounded by a variable buoyancy-generating chamber assembly 30, which includes six variable buoyancy-generating chambers 34A through 34F.

FIG. 12 is a schematic view 72 of one particular implementation of the wind turbine embodiment of the invention. The air control system 64 is positioned on a functional loading area 40, which is held by a diagonal support structure 76. The support structure 76 is held in place by a statically buoyant chamber 20. A set of variable buoyancy-generating chambers are attached to the bottom portion of the statically buoyant chamber 20.

The air control system 64 is connected to a set of ducts or pipes 78, which convey air from the air control system 64 to air inlets 80 that have been formed in the variable buoyancy-generating chambers 34A and 34B. These chambers 34A and 34B also have water inlets 82 formed on their lower surface.

FIG. 13 offers another illustration 84 of the apparatus shown in FIG. 12, but which is provided in a side view.

II. Operation of the Invention

When the wind turbine embodiment is deployed on an ocean, or some other body of water, it generally experiences torque imposed by the force of the wind W. For example, a wind turbine that is 650 feet high, and for a platform that presents an average cross-sectional diameter of 505 feet, and that experiences a wind velocity of 45 miles per hour would be subject to a force or torque of 44,640 Newtons or 10,035 pounds. For a force that impinges at a height of 123 meters above the surface of the water in a 45 MPH wind, the moment that is generated is 5,490,720 Newton Meters (approximately 5.5 MegaNewton Meters) or 4,049,747 Foot Pounds.

The force imposed by the wind W may be similarly calculated for a building, bridge or other structural embodiment. This force changes the position or orientation of the wind turbine, and moves or pushes it from its stable and optimal position, which is perpendicular to the generalized horizontal plane of the surface of the water 14. The term "generalized horizontal plane of the surface of the water" refers to a plane that approximates an average water level, taking into account waves, swells and other localized differences in the general altitude of the water.

This natural force imposed by the wind W may also be referred to as a "torque," "moment," or "moment of force." A torque is generally defined as the tendency of a force to rotate an object about an axis, fulcrum or pivot. See *Wikipedia*.

The present invention provides apparatus and/or methods for sensing this force imposed by the wind W, and then producing a counter-acting force which returns the turbine to its optimal vertical position.

In one embodiment, the primary valve system includes two inhale valves 146 & 148, and is responsible for the continuous modulation of the air pressure within the variable buoyancy-generating chambers 34A & 34B. The primary valve system is controlled by the CPU 98. The first valve, or inhale valve 146, runs along the length of the air duct 78 and is opened when more pressure is needed within the variable buoyancy-generating chamber. When the first inhale valve 146 is opened, air from the compressed air tank flows into the respective variable buoyancy-generating chamber, thereby displacing more water within the underwater chamber, and generating a larger upward force. The second valve, or exhale valve, is located on the air duct 78, and is positioned in between the first valve and the body of the variable buoyancy-generating chamber. This exhale valve is proximal to the inhale valve 146 and is above the water line for ease of maintenance. Together, they compose this "primary valve system." This second valve is on the face of the air duct 78 and is connects the duct to atmospheric air. When the second valve is opened, (and the inhale valves 146 & 148 are closed) compressed air from within the variable buoyancy generating chambers 34A & 34B is able to escape into the atmosphere, which is at a lower pressure. In order for either of these two valves to function, the other must be closed.

The emergency valve is part of the redundant emergency system, with the primary goal of preventing the platform from sinking, and protecting the air control system (compressors, compressed air tank, inhale/exhale valve, etc.) from corrosive salt water. The water sensor is located underwater right next to the variable buoyancy-generating chamber inlet. Water is to never enter the air duct 78 as it would provide no operational purpose. This sensor is to be robust as its location underwater would make it difficult to provide maintenance to. The emergency valve is to be located upstream of the water sensor along the air duct 78. If the water sensor detects the presence of water, the emergency valve will immediately shut and thus prevent water from tracking up the air duct 78.

Each variable buoyancy-generating chamber 34A & 34B must have its own independent set of sensors and actuators, but they can draw from the same compressed air tank 170. If there were six chambers, there would need to be six of each the primary and secondary buoyancy generating chambers.

Figure 13A:
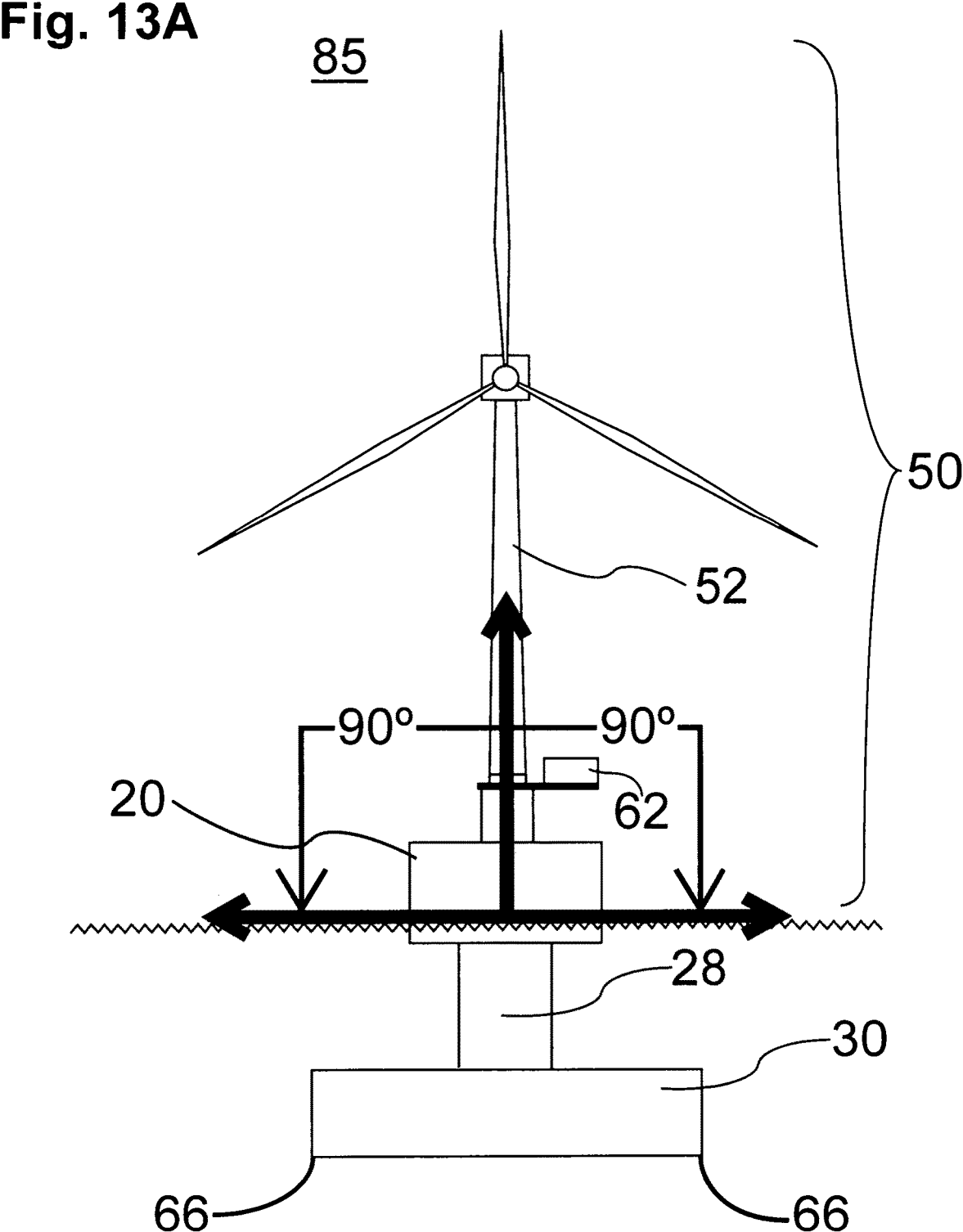

FIG. 13A provides a simplified view 85 of a wind turbine embodiment. In this view, the wind turbine 50 extends in a line that is vertical, meaning that angle measured between the generalized plane of the surface of the water 14 tower 52 is ninety degrees. This is the normal or optimal operating position of the wind turbine 50. This normal position is maintained as long as the force imposed by the wind W, at a time $t_0$, is zero.

Figure 13B:
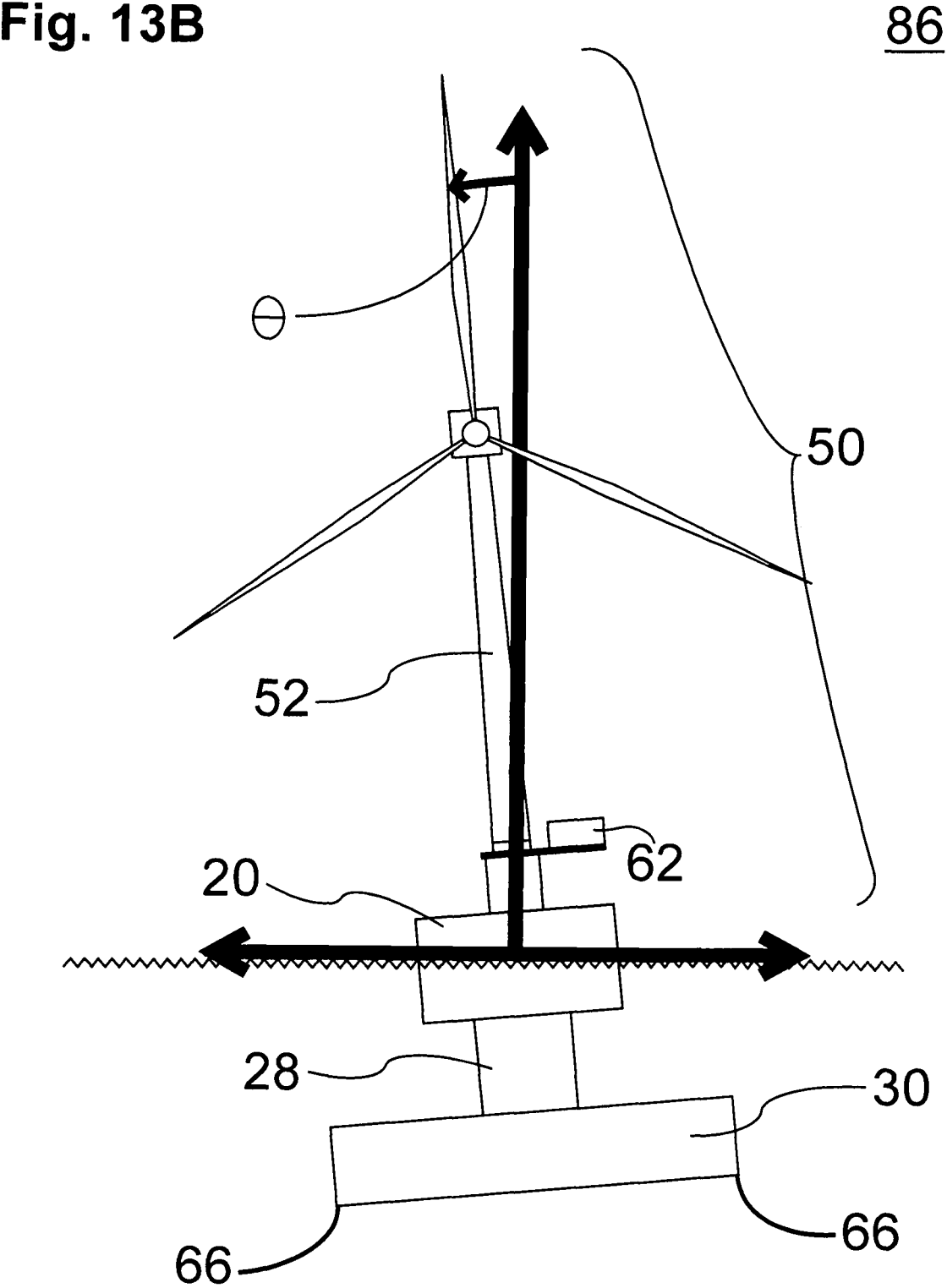

FIG. 13B provides another simplified view 86 of the wind turbine 50 when a wind W is blowing. The wind W pushes or rotates the turbine 50 in a direction that is opposite from the direction of the wind W. In FIG. 13B, the turbine's position has been changed by the torque imposed by the wind W. Specifically, the angle between the generalized plane of the water and the vertical axis that extends up from the base to the top of the tower 52 is no longer ninety degrees. The wind W, now blowing at a time $t_1$, which is later than time $t_0$, is moving at a speed which is greater than zero. This non-zero angle is identified and measured by the Greek character θ.

FIG. 13C shows a portion of one embodiment 88 of a wind turbine 50 which includes a set of sensors 90 that are affixed to the exterior of the tower 52. These sensors 90 measure the speed, and the direction, of the wind at any particular time. The "velocity" of the wind W is a quantity which is described by a vector, as opposed to a scalar, which includes both speed and direction information.

Figure 13D:
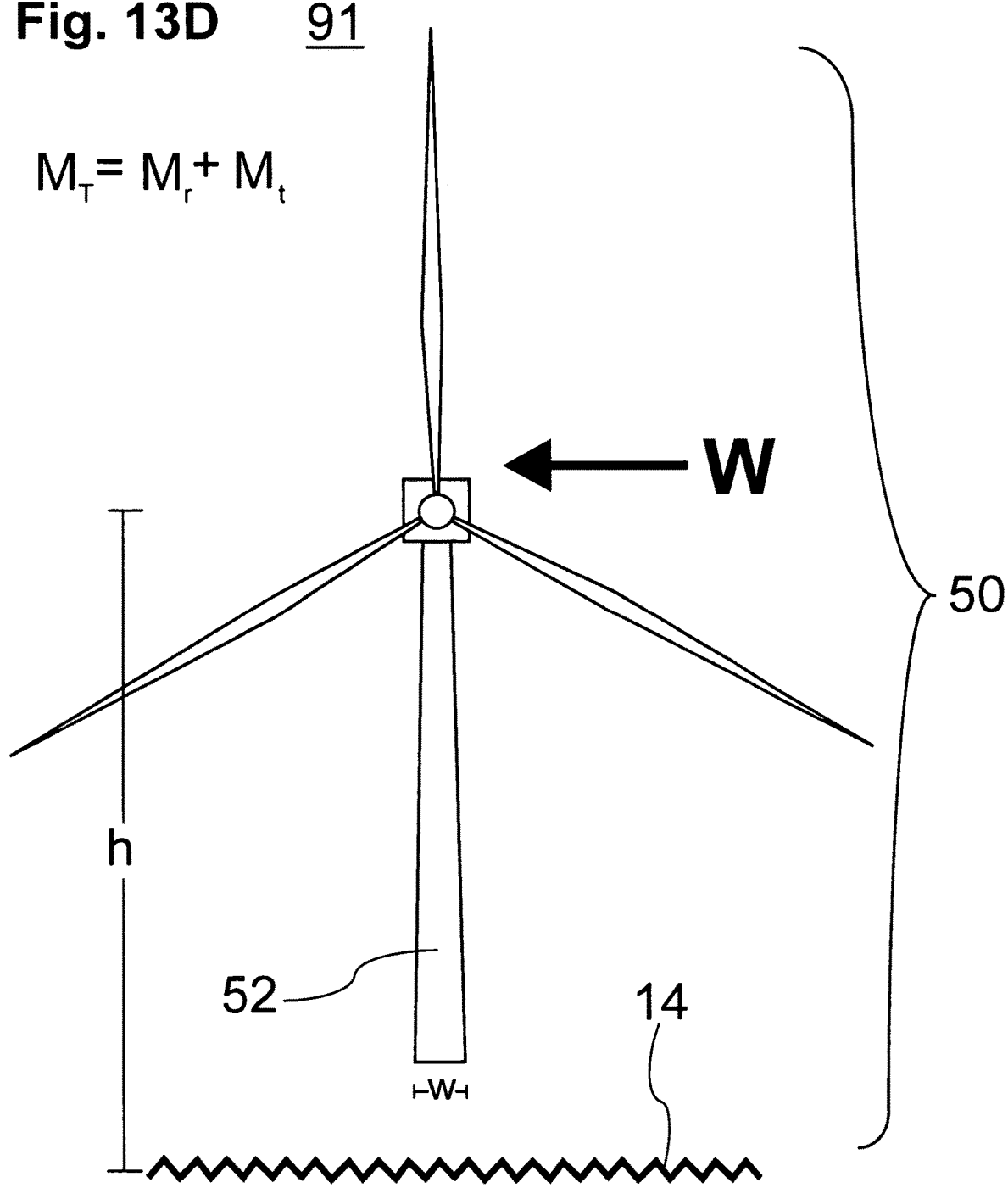

FIG. 13D is another simplified illustration 91 that shows how the force of the wind W is calculated. The turbine tower 52 has a known height, h, and a known average cross section, w. The torque is calculated by multiplying the height, the average cross section, and the wind speed. The resulting torque is measured in units called foot-pounds, or Newton meters in the metric system. The torque is represented by Equation One:

$$M_T = M_r + M_t$$

where $M_T$ is the total moment;

$M_r$ is the moment generated by the rotors of the turbine; and $M_t$ is the moment generated by the turbine tower.

Figure 13E:
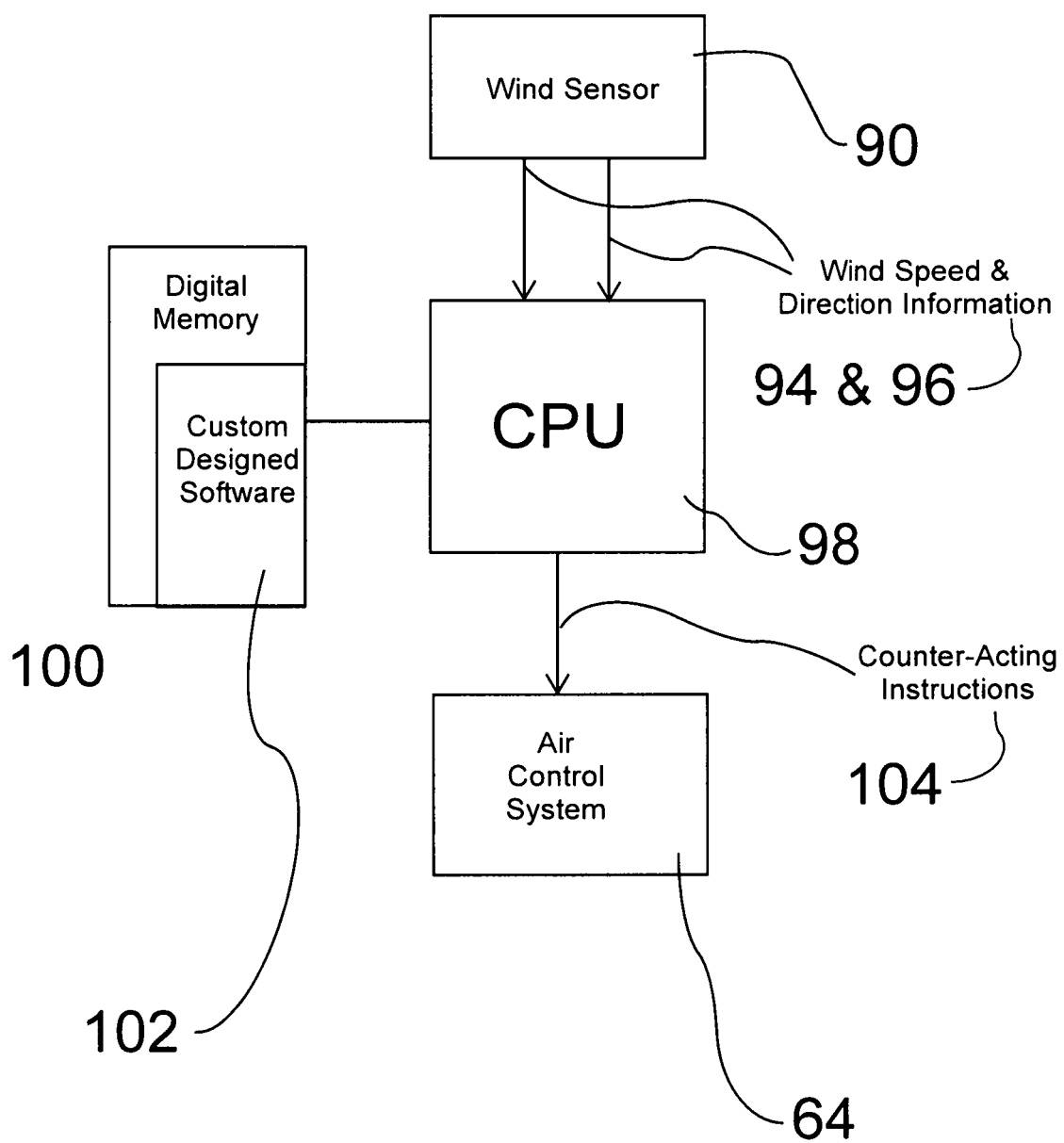

FIG. 13E offers a schematic block diagram 92 which explains the operation of one embodiment of the present invention. One or more wind sensors 90 measure the speed of the wind W, which may be blowing from any direction (from zero to three hundred and sixty degrees around the compass) toward the tower 52. The sensor or sensors 90 produce electrical outputs or signals that convey wind speed and direction information 94 & 96 to a central processing unit or computer 98. The computer 98 is connected to a computer memory 100. Custom designed software 102 is stored in the memory 100. The computer 98, which runs the custom designed software 102, uses the outputs 94 & 96 from the wind sensor(s) 90 to calculate counter-acting instructions 104. These instructions 104 are fed to the air control system 64, which immediately acts to counter the undesirable force of the wind W.

Figure 13F:
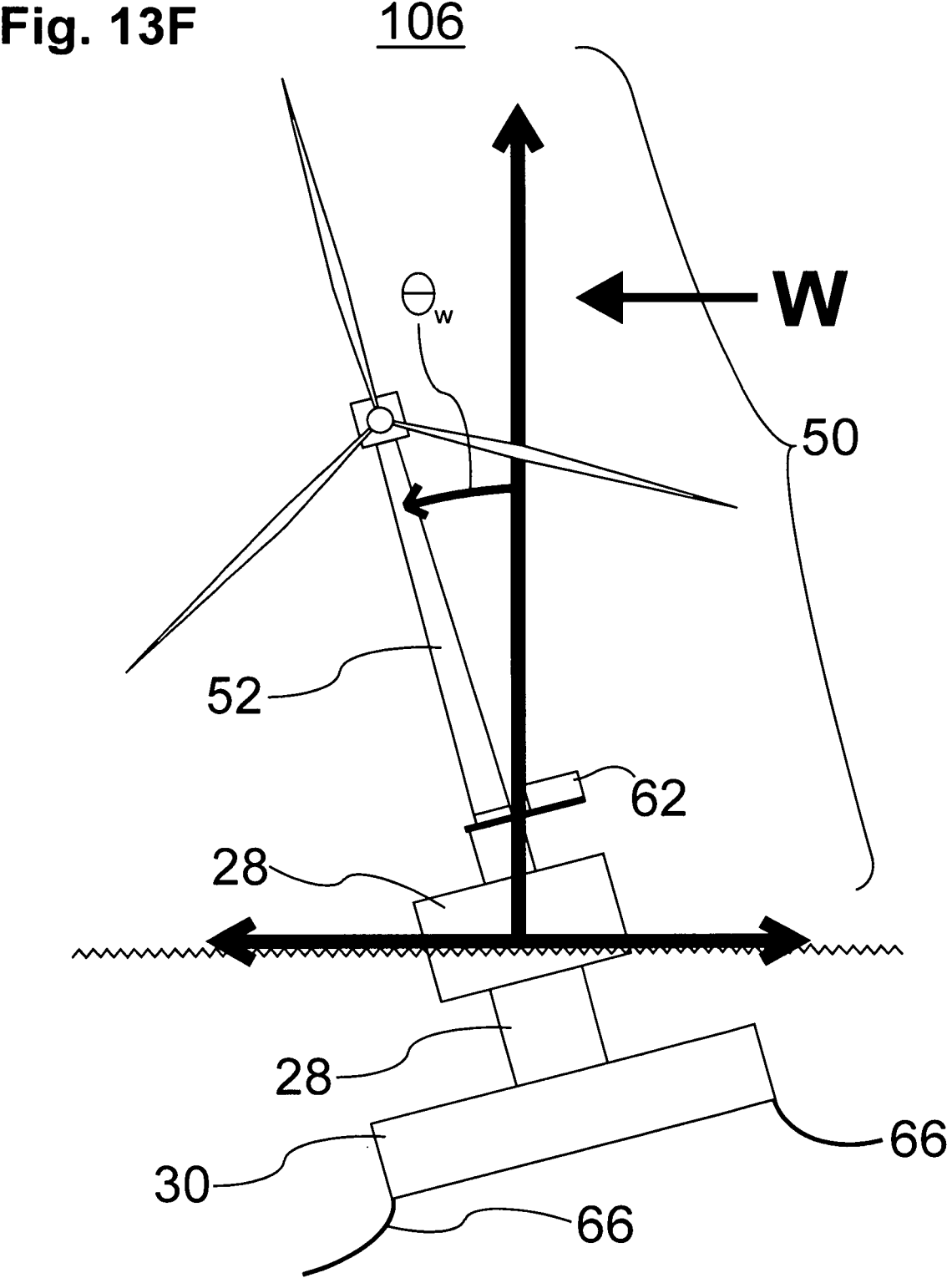
Figure 13G:
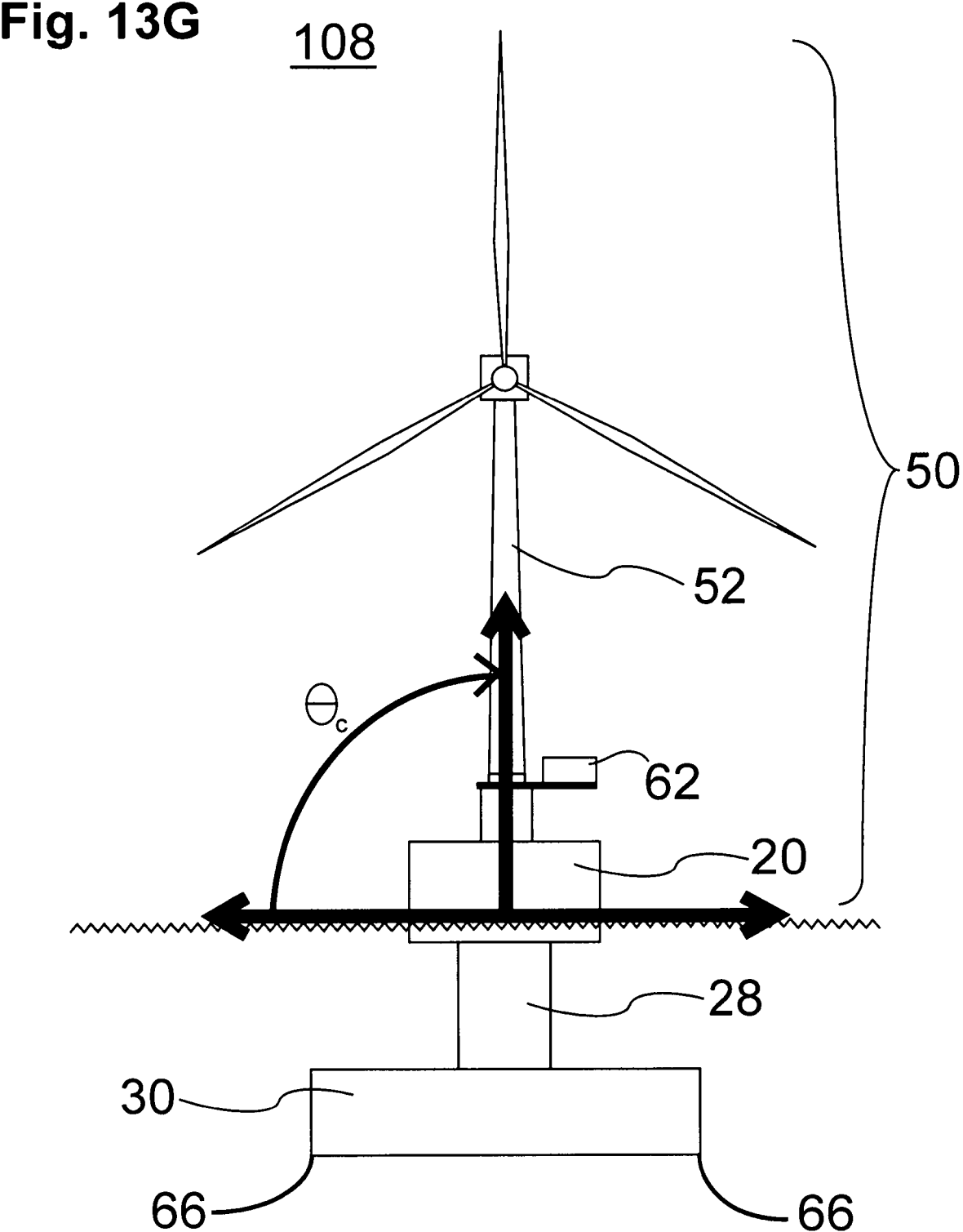

FIG. 13F supplies a view 106 that shows a wind turbine 50 which has been "pushed over" beyond its normal vertical position by a gust of wind W. In FIG. 13G, the vertical axis of the tower 52 has been displaced or rotated by an angle identified as $θ_W$.

As shown in the view 108 depicted in FIG. 13G, after the air control system 64 has interpreted the information about the unbalancing force of the wind W at any moment, a counter-acting force has been generated which pushes the turbine back through and equal but opposite direction identified in FIG. 13G as $θ_C$. The wind turbine 50 has now been automatically restored to its normal, upright position, which is orthogonal to the generalized plane of the surface of the water.

III. Detailed Description of the Generation of a Counter-Acting Torque

FIG. 14 is a schematic view 110 of the embodiment shown in FIG. 13 which also shows two schematic weight loads 112 & 114. These weight loads 112 & 114 are pictorial representations of the forces which act on the platform 12 as a result of the original, first and second internal water levels 116 & 118 in the variable buoyancy-generating chambers 34A & 34B. The chambers 34A & 34B may be filed with water to create counter-balancing forces in response to the weight loads 112 & 114 that are imposed by the wind and the body of water. Any remaining space in the chambers 34A & 34B is filled with first and second original amounts pressurized air 120 & 122. FIG. 14 shows the condition of the first and second internal water levels 124 & 126, at a later time. At this subsequent time, the water levels in the chambers 34A & 34B are equal. The first and second equal volumes of water 128 & 130 in the chambers provides an equal, but opposite, balance of forces that counteract the moments generated by the weight loads 112 & 114.

FIG. 15 presents another schematic view 132 of the embodiment shown in FIG. 14, which shows increased weight loads 112 & 114. In response to the increased weight loads 112 & 114, the air control system 64 has pumped more pressurized air into the chambers 34A & 34B. Consequently, the internal water levels 124 & 126 in the chambers 34A & 34B have gone down due to the displacement of water. The counteracting forces on the platform 12 have been changed in an automatic reaction to the increased weight loads 112 &

114. Since the weight loads 112 & 114 are changed, but still equal, the internal water levels 124 & 126 have changed, but are remain equal.

FIG. 16 supplies another schematic view 134 of the embodiment shown in FIG. 15, but reveals that the weight loads 112 & 114 have changed, and are now unbalanced. The weight load imposed on the right side 114 of the platform 12 now3 exceeds the weight load on the left side 112. In response to the change in forces that act on the platform 12, the air control system 64 has again changed the configuration of the chambers 34A & 34B. In FIG. 16, pressurized air has been vented from chamber 34A, while more pressurized air has been conveyed into chamber 34B. The internal water levels 124 & 126 have been altered so that the moments created by the ballast in chambers 34A & 34B now furnishes forces which neutralize the change in the weight loads 112 & 114.

FIG. 17 presents a schematic view 136 that reveals additional elements of the air control system 64. The air control system 64 includes a gyroscope 138 which detects the orientation of the platform 12. The gyroscope 138 produces position information, and is connected to a radio 140 which has an antenna 142. Radio signals may be transmitted to and/or received from the platform 12 to another radio located at a remote location (not shown).

The platform 12 also includes a set of accelerometers 144, which are positioned at each corner. (See FIG. 18).

The air control system 64, which includes the CPU 98, operates first and second primary inhale valves 146 & 148 and first and second secondary exhale valves 150 & 152. These valves are operated by the CPU 98, and are used to change the amount of air in the chambers 82. First and second pressure sensors 154 & 156 detect the pressure in the lines that are connected to chambers 34A & 34B. First and second emergency pressure valves are used to expel fluid in the event of an emergency. First and second water sensors 158 & 160 measure the water levels in the chambers 34A & 34B.

FIG. 18 presents a schematic view 162 of the elements of one embodiment of the control system. A power source 164 is connected to primary and secondary air pumps or compressors 166 & 168, or some other suitable type of pumping device, which adjust the pressure inside a compressed air tank 170. In one embodiment, the power source 164 is a battery or a generator. The battery 164 may be connected to a solar panel (not shown). This tank 170 is connected to a pair of primary inhale valves 146 & 148, to a set of secondary exhale valves 150 & 152, and through air inlets 80 on the chambers 34A & 34B. Each chamber 34A & 34B also has a water inlet 82. An air motion sensor system 172 is connected to the CPU 98, and is also connected to four accelerometers 144A, 144B, 144C, 144D and to the gyroscope 138. An air sensor system 174 is also connected to the CPU 98, and is also connected to first, second and third pressure sensors 154, 156 and 171, as well as to first and second water sensors 158 and 160. An environment sensor system 176 is also connected to the CPU 98, and is coupled to first and second wind sensors 177A, 177B, as well as to first and second wave sensors 177C and 177D (See FIG. 19).

FIG. 19 presents a schematic block diagram 178 of one embodiment of the invention that is used to control normal autonomous operations. These operations are typically continually refreshed, at least every few seconds.

The CPU 98 is shown connected to several sources of information: accelerometer data 180, gyroscope data 182, antenna data 184, air pressure data 186, water sensor data 188 and temperature data 190. Each of these sources of information reports the condition of the platform 12 as it floats on the water.

All the sensor data is transmitted to the CPU 98, and the CPU 98 interprets the data. Algorithms are used to determine outputs from the CPU 98 which are fed to the first primary valve 146, a second primary valve 148, a first secondary valve 150, a second secondary valve 152, a first emergency valve 157A, a second emergency valve 157B, a primary air compressor 166 and a secondary air compressor 168.

Algorithms Used by the Present Invention

The general cyclical method employed by one embodiment of the present inventions is: sense, compute, actuate, then repeat. This is a typical flow path for automated mechatronic systems.

The cycle rates may be different for various sensors employed by different embodiments. The cycle rate is synthesized by the CPU 98, which operating rate. The CPU 98 dictates instructions to the various actuators.

The sensor system encompasses a wide variety of sensors that create data which is transmitted to the CPU 98. The quantity, chosen redundancy, and types of sensors are selected to optimize the various functions of the different embodiments of the invention. The minimum requirement is that the sensors provide sufficient consumable data to ensure that the actuators are empowered to effectively counteract the forces that are imposed on the platform 12 by wind and waves. In one embodiment of the invention, the platform or structure 12 is maintained in a position that is less than one-degree deviation from true plumb. The sensor data is processed by the CPU 98 that employs one or more human-created (and human fine-tuned) algorithms to produce instructions to the actuators, such as air compressors and mechanical valves.

Actuators have physical limitations, including what is conventionally known as a "response time." Although some electronic actuators and computer systems have latency periods that are so minimal that they may be effectively ignored, macroscopic mechatronic actuators can have significant and relevant response times. In one embodiment of the invention, sensors are strategically positioned at a distance from the main body of the turbine unit to enable them to predict the forces that will be imposed on the turbine in the immediate future. The sensors are electronically linked to the main body, which enable the sensors to deliver information on physical conditions to the CPU 98 prior to them actually being imposed. This configuration affords additional time for the actuators to provide a physical response in time to meet the physical conditions. These "early detection" sensors includes both the air and water sensors.

The sensors provide sufficient data for the CPU 98 to calculate a net force. Although the data that each sensor provides may come in different units, the CPU 98 determines a specific natural force imposition on the turbine. This force, which is calculated and quasi-determined before it happens, is the basis of the actuator response. This process of determining a net force is the process of synthesizing all of the sensor data into universal units that can be summed to prepare for an actuator response.

This actuator response causes the release of high pressure air (above water and stored in a compressed air tank that is fed by redundant air compressors) into and out of the variable buoyancy-generating chambers to change the buoyant force generated by the respective chambers. The algorithm or algorithms that are utilized enable the present invention generate a force close to the ideal in both magnitude and direction. Since the alignment of the wind turbine units change relative to the wind and other natural forces, overturn moments of the same magnitude involve different air/water ratios within the variable buoyancy-generating chambers to compensate for the chamber boundary/desired moment variance. The quantity of individual variable buoyancy-generating chambers is inversely proportional to the range of potential radial responses that are applied in unique combinations of chamber forces that are required to maintain plumb.

In one embodiment which employs six variable buoyancy-generating chambers, the desired net force's position may fall within six segments, of the 360 degree plane defined by the water surfaces. Each of those "slices" contains 60 degrees, of which there is really a mirrorable 30 degree quantity of range. If the number of variable buoyancy-generating chambers is increased to nine, the 30 degrees would decrease to 20 degrees as the mirrorable slices decrease from 60 degrees to 40 degrees. It is the responsibility of the inherent algorithm to understand these parameters and compute/dictate responses that are effective.

The algorithms include the expected response time for the desired buoyancy force to manifest and provide any desired counter force.

Sensors & Valves

In one embodiment of the invention, wind speed and direction information 94 & 96 are produced by the sensor 90, and fed to the CPU 98. The CPU 98 interprets the signals received from the sensor 90, and interprets or converts these input signals to instructions or output signals 104. This conversion process is accomplished by the custom designed software 102 which is stored in memory 100, and which runs on said CPU 98.

As shown in the embodiment illustrated in FIG. 19, the CPU 98 controls the autonomous management of the platform system. One or more input signals received from one or more sensors flow into the CPU 98. The CPU 98 uses custom designed software and algorithms 102 stored in memory 100 to interpret these input signals, and the state of the CPU 98 is changed. The changed state of the CPU 98 produces output signals which control one or more valves, one or more compressors. The amounts of air and or water in the multiple chambers changes, and creates a counteracting force that stabilizes the platform.

Opening the primary valves 146 & 148 exposes the variable buoyancy-generating chambers 34A & 34B to high pressure air, which drives the internal water level down. Opening the secondary valves 150 & 152 exposes the variable buoyancy-generating chambers 34A & 34B to lower-pressure atmospheric air, thereby decreasing their own internal pressure as air is released to the atmosphere. This has the effect of raising the internal water level within the respective chamber.

As a failsafe, if the water sensor (which is located in the air duct 78 above each variable buoyancy generating chambers 34A & 34B) detects the presence of water, it will automatically seal the primary air valves 146 & 148. This will protect the air compressors 166 & 168 and pressurized tank from water damage.

In the event of high cyclic loading where the pressures within the variable buoyancy-generating chambers 34A & 34B needs to be changed rapidly, the secondary air compressor 168 may be utilized to help fill the compressed air tank 170. Otherwise, its purpose is to turn on in the event that the primary air compressor 166 breaks down.

IV. Additional Details of Preferred & Alternative Embodiments

In one embodiment of the invention, the statically buoyant chamber 20 may be semi-submerged, or not submerged at all during typical operation. In the event that all of the variable buoyancy-generating 22 chambers fail and are flooded with water, the statically buoyant chamber 20 will naturally become more submerged, and thus provide a progressively larger upward buoyant force until the platform 12 is neutrally buoyant and floating. This is a redundant system for the purpose of ensuring the structure does not sink to the sea floor and become unrecoverable.

In one embodiment, the statically buoyant chamber 20 will have no inlets, and may be permanently evacuated of air (during construction) to become a near-vacuum. Once sealed, the chamber is never to be opened to ensure that there is no potential for water intrusion. The statically buoyant chamber 20 is large enough such that the volume of water it could displace in the event of variable buoyancy-generating chamber failure is of a mass greater than that of the entire dry structure, and there will likely be a safety factor of approximately 1.2×.

In one embodiment, the variable buoyancy-generating chambers 22 are constructed in a similar way, although they may be of smaller size. The primary difference is that the variable buoyancy-generating chambers 22 have an air inlet on the top side connected to an air-compressor system and a water inlet on the bottom side that is open to the surrounding ocean water. (These details are described below).

The air compressor system forces air in to the chamber, and thereby displaces water and generate a buoyant force.

Platforms 12 may be constructed out of structural steel or reinforced steel concrete. Aluminum may also be used and has far superior corrosion-resistant properties. Similarly, carbon-fiber might be employed for future iterations of the structure. To eliminate the possibility of corrosion, in both cases the structure is thoroughly coated in waterproofing material that is rated to last for a minimum of twenty years.

If the platform 12 incorporates concrete, stainless steel rebar may be used to further the risk of any corrosion. Since the interior of the variable buoyancy-generating chambers 22 are exposed to seawater, the entirety of the interior is coated for corrosion concerns. As the size of the water inlet is generally irrelevant (provided that it meets a minimum size threshold where surface friction can be considered irrelevant), it is designed to be large enough for a construction worker to fit through to perform this work.

Generally, the fatigue properties of the primary structural material is well understood, and the structure is designed in the digital space so that finite element analysis performed. There is a much better understanding of the fatigue properties of steel and other metals, as compared to reinforced concrete. Finite element analysis is utilized, and ensures that the expected high levels of cyclic loading are able to be absorbed by the platform without risk of structural failure.

This method of modeling is used to generate the preliminary algorithms which control the air compressor system. This system, which is described in more detail below, manipulates the levels of water within each of the variable buoyancy-generating chambers 22. Unlike a building which generally has low-magnitude cyclical loading, these structures encounter high magnitude cyclic loading from both wave currents and wind.

In one embodiment, the primary structure is constructed in a dry dock. Alternatively, the system may be prefabricated in smaller pieces, and then a final assembly performed in a dry dock or location proximal to the ocean from which the system is lifted by a crane in to the water. Once afloat in water, the structures are then be dragged out to the final or desired location by a tugboat. Once there, the cables are affixed to the structure, and the remaining construction would only consist of whatever is to be installed or built on top of the structure.

Another embodiment of the invention may be permanently moored. In this case, the structure is tethered to anchors on the seabed (likely large concrete blocks) steel cables. The cables are coated to protect from corrosion. Each unit has several cables (likely three), which provides multi-directional stability. This design eliminates the potential for yaw to cause the structure to rotate on a plane defined by the surface of the ocean. In the event where multiple units are installed in relative proximity, there may be employed by multiple floating structures. Cables are tethered to the floating structure with pin joints that may be embedded in the concrete or welded to the steel.

For a Falcon 9 rocket launch, the system is approximately 50 meters across, 100 meters long, and extends 50 meters down in to the ocean. For a typical 6-10 MW offshore wind turbine, the system is designed to extend 50 meters down, and has variable buoyancy-generating chambers whose extremities are 50 meters distant from end to end.

V. Benefits Provided by the Present Invention

One embodiment of the present invention requires a substantially smaller foundation size. To date, the only commercial floating foundations are in excess of 7,500 tons, including one that uses an iron ore ballast which is located in Hywind Scotland. The invention may be constructed so that it is potentially an order of magnitude smaller that existing systems.

One embodiment of the invention greatly reduces the formidable construct ability issues that are largely driven by size and weight. These construction problems are severe challenges that constrain the construction of existing structures.

One embodiment uses foundations which are at the upper limit of what cranes are able to lift (i.e., greater than 1,000 tons). These foundations are substantially larger than what is able to be transported on road or rail. The Hywind Wind Turbine has a foundation which measures 14 meters and is 90 meters long, and must be built at or near the ocean. Large foundations are too deep to be built in dry dock.

One embodiment offers the potential to lower material fatigue in both the wind turbine and the foundation itself through the reduction in cyclic loading mean stress. The invention may use the iteration of algorithms taking environmental inputs such as wind and sea conditions. These algorithms may be used to regulate air pressure outputs in the ballast tanks, and may also be employed to damp oscillation in addition to counteracting the immediate overturn moment.

The invention also has the potential to eliminate the occurrence of resonant frequencies throughout the turbine assembly, and has the potential to actively dampen asymmetric wind inputs and gusts.

VI. Definition of Terms

The following Glossary is intended to provide a quick reference tool for the reader, but is not intended to exclude any or common or technical meanings of the terms that follow.

AC Power Line—An alternating current power source comprising a means for providing electrical energy for use by the sensors, actuators, and all components of the air compressor system that require electricity to function.

Air Compressor—A device that is able to produce air at a pressure that exceeds atmospheric pressure.

Air Valve—A means for sealing and preventing fluid exchange between two volumes of different pressure. An air valve allows air of different pressures to exist adjacent to each other.

Axial Compressor—An axial compressor is a mechanical air compressor that produces compressed air by forcing air through rotating fan stages with decreasing open space. Fans and static blades are arranged along the rotational axis in repeating fashion (i.e., rotating fan, static blades, rotating fan, static blades, etc.). As the fans spin, they drive air down the axis to subsequent stages that each have less room for the air. As the mass flow must remain constant, the air increases in pressure as the same number of molecules is forced into a smaller space.

Battery—A means for storing and providing electrical energy for use by the sensors, actuators, and all components of the air compressor system that require electricity to function.

Butterfly Valve—A mechanical Air Valve. A butterfly valve consists of a circular disc that can be rotated so as to be parallel or orthogonal to the axis of fluid pipe in which is it affixed. In the parallel position, the face of the disc runs along the direction of the pipe, allowing fluid to flow freely from the higher pressure side into the lower pressure side. In the orthogonal position, the face of the valve is parallel to the cross-section of the pipe and thus completely restricts the fluid flow.

DC Power Line—A direct current power source comprising a means for providing electrical energy for use by the sensors, actuators, and all components of the air compressor system that require electricity to function.

Diaphragm Valve—A mechanical Air Valve. A diaphragm valve is a valve that consists of an internal and flexible diaphragm that can be expanded by filling it with compress air from a source other than the pipe the valve is designed to restrict flow within. When the diaphragm is inflated, it occupies the entire local region of the pipe and thus restricts fluid flow from the higher pressure side to the lower pressure side.

Globe Valve—A mechanical Air Valve. A globe valve is a valve that creates a channel orthogonal to the primary axis of the pipe it is embedded in and that is mean to restrict. By forcing fluid to flow through the orthogonal channel, a globe valve is then able to restrict flow by blocking said orthogonal channel with a rubber stopper. This stopper can easily be inserted and removed from the orthogonal channel through the use of a screw or pressure-actuated piston.

High Pressure Air Compressor—An Air compressor that produces air that generally exceeds 100 pounds per square inch.

Low Pressure Air Compressor—An Air Compressor that produces air that does not exceed 150 pounds per square inch.

Medium Pressure Air Compressor—An Air Compressor that produces air at a pressure that generally ranges between 150 pounds per square inch and 1000 pounds per square inch.

Pinch Valve—A mechanical Air Valve that uses a pinching effect to obstruct fluid flow. A flexible internal membrane can be inflated from the exterior of the valve, and once it is fully inflated, it blocks air flow along the pipe.

Rotary-screw Compressor—An Air Compressor that produces compressed air by spinning a screw within an airtight compression compartment. As air passes from the entrance side of the compartment and is driven to the exit, the pitch of the screw decreases and the same molecules of air are forced into a smaller volume, thus generating pressurized air.

Rotary-Vane Compressor—An Air compressor with an internal circular rotor that is not concentric with the large circular cavity inside of which it rotates. Vanes that slide relative to the internal circular rotor create air pockets that initially increase in size (inhale stroke) to draw in air, and then decrease in size (exhale stroke) after the air inlet has been sealed to compress the air.

Scroll Compressor—An Air compressor that involves two scrolls (which may be in the shape of Archimedean spirals or other hybrid curves), one of which is fixed and the other of which orbits eccentrically without rotating. This motion traps and pumps pockets of air between the scrolls and drives them into cavities of smaller sizes, thus compressing the air.

Single-stage Reciprocating Air Compressor—A device that is able to produced compressed air by trapping air within a compartment and reducing its volume through the use of its piston. During the volume-reducing stroke, air molecules are prevented from escaping said compartment. A Single-stage Reciprocating Air Compressor has only one piston size and compression ratio.

Two-stage Reciprocating Air Compressor—A device that is able to produce compressed air by trapping air within a compartment and reducing its volume through the use of a piston. During the volume-reducing stroke, air molecules are prevented form escaping said compartment. A Two-stage Reciprocating Air Compressor has two piston sizes and compression ratios. After being compressed within the first piston compartment, air is channeled to a secondary piston where the process is repeated and the air is compressed further.

SCOPE OF THE CLAIMS

Although the present invention has been described in detail with reference to one or more preferred embodiments, persons possessing ordinary skill in the art to which this invention pertains will appreciate that various modifications and enhancements may be made without departing from the spirit and scope of the Claims that follow. The various alternatives for providing a Rocket Launch Platform Stabilization System have been disclosed above are intended to educate the reader about preferred embodiments of the invention, and are not intended to constrain the limits of the invention or the scope of Claims.

LIST OF REFERENCE CHARACTERS

10 Offshore rocket launch embodiment
12 Platform
14 Body of water
16 Rocket
18 Rocket launch support tower
19 Top surface of platform
20 Statically buoyant chamber
22 Variable buoying-generating chamber
24 Building embodiment
26 Structural support assembly
28 Structural supports
30 Variable buoyancy-generating chamber assembly
32 Building supports
34 Multiple variable buoyancy-generating chambers
36 Alternate embodiment of building embodiment
38 Embodiment showing platform supports
40 Functional loading area
42 Horizontal structural supports
44 Bridge embodiment
46 Bridge
48 Wind turbine embodiment
50 Wind turbine
52 Turbine tower
54 Nacelle
56 Rotor hub
58 Rotor blades
60 Maintenance platform
62 Turbine tower connection
64 Air control system
66 Cable tether
67 Cable attachment
68 Embodiment of structure below platform
70 Detailed view of structure below platform
72 Embodiment of structure below wind turbine embodiment
76 Support structure
78 Air duct
80 Air inlet
82 Water inlet
84 View of structure below platform of wind turbine embodiment
86 Illustration of reaction to wind
88 View of top portion of turbine in wind
89 View of tower with sensors
90 Sensor
92 Schematic block diagram
94 Wind speed information
96 Wind direction information
98 CPU
100 Memory
102 Custom designed software
104 Instructions
106 View showing wind turbine which has been pushed over beyond its normal vertical position by a gust of wind
108 View of turbine after air control system has interpreted information about unbalancing force of wind
110 Schematic view showing weight loads
112 Pictorial representation of first weight load
114 Pictorial representation of second weight load
116 Original first internal water level
118 Original second internal water level
120 First volume of pressurized air
122 Second volume of pressurized air
124 Subsequent first internal water level
126 Subsequent second internal water level
128 First equal volume of water
130 Second equal volume of water
132 Schematic view showing increased weight loads
134 Schematic view showing elements of air control system
136 Schematic view showing additional elements of air control system
138 Gyroscope
140 Radio
142 Antenna
144 Accelerometers
144A First accelerometer
144B Second accelerometer
144C Third accelerometer
144D Fourth accelerometer 146 First primary inhale valve
148 Second primary inhale valve
150 First secondary exhale valve
152 Second secondary exhale valve
154 First pressure sensor
156 Second pressure sensor
157A First emergency valve
157B Second emergency valve
158 First water sensor
160 Second water sensor
162 Schematic view of elements of control system
164 Power source
166 Primary air compressor
168 Secondary air compressor
170 Compressed air tank
171 Pressure sensor
172 Motion sensor system
174 Air sensor system
176 Environment sensor system
177A First wind sensor
177B Second wind sensor
177C First wave sensor
177D Second wave sensor
178 Schematic diagram showing normal autonomous operation
180 Accelerometer data
182 Gyroscope data
184 Antenna data
186 Air pressure data
188 Water sensor data
190 Temperature data

What is claimed is:

1. An apparatus comprising:
a structure;
said structure being configured to float in a body of water; said structure having a top surface; said top surface being generally positioned above the surface of said body of water;
said structure having a plurality of variable buoyancy-generating chambers; each of said plurality of chambers each for holding a volume of fluid;
said plurality of variable buoyancy-generating chambers being substantially submerged below said surface of said body of water; each of said variable buoyancy-generating chambers having a port for changing said volume of fluid in each of said plurality of variable buoyancy-generating chambers;
a sensor; said sensor being mounted on said structure; said sensor for detecting the orientation of said structure relative to said surface of said body of water;
a computer processor unit; said computer processor unit being mounted on said structure; said computer processor unit including a memory; said memory for storing custom designed software; said custom designed software for automatically managing said position of said platform;
said computer processor unit being connected to said sensor; said sensor for interpreting data received from said sensor;
an air compressor; said air compressor being connected to said computer processor unit; said air compressor being connected to each of said plurality of variable buoyancy-generating chambers;
said air compressor for changing said volume of fluid in each of said variable buoyancy-generating chambers in response to a signal from said computer processor unit;
a plurality of valves; each of said plurality of valves being connected to one of said plurality of variable buoyancy-generating chambers; each of said plurality of valves for changing said volume of fluid in each of said variable buoyancy-generating chambers based on a signal received from said computer processor unit to compensate for unwanted forces impinging on said structure.

2. An apparatus as recited in claim 1, in which said structure is a platform.

3. An apparatus as recited in claim 1, in which said structure includes a top surface.

4. An apparatus as recited in claim 1, further comprising:
a rocket; said rocket being disposed on said top surface of said platform; said rocket being disposed to launch into orbit from said platform.

5. An apparatus as recited in claim 1, further comprising:
a building; said building being disposed on said top surface of said platform.

6. An apparatus as recited in claim 1, further comprising:
a bridge; said bridge being disposed on said top surface of said platform.

7. An apparatus as recited in claim 3, further comprising:
a wind turbine; said wind turbine for converting the force of wind to electrical power.

8. An apparatus as recited in claim 1, in which a portion of each of said variable buoyancy-generating chambers may be filled with air.

9. An apparatus as recited in claim 1, in which a portion of each of said plurality of variable buoyancy-generating chambers may be filled with water.

10. An apparatus as recited in claim 1, in which each of said plurality of variable buoyancy-generating chambers has a water inlet.

11. An apparatus as recited in claim 1, in which each of said plurality of variable buoyancy-generating chambers is connected to an air duct.

12. An apparatus as recited in claim 1, in which said CPU is connected to a radio for processing wireless signals.

13. An apparatus as recited in claim 1, in which said CPU is connected to an accelerometer for obtaining information about the acceleration of said structure.

14. An apparatus as recited in claim 1, in which said CPU is connected to a gyroscope for obtaining information about the position of said structure.

15. An apparatus as recited in claim 1, in which said CPU is connected to a radio for processing wireless signals.

16. An apparatus as recited in claim 1, in which said CPU is connected to an air pressure sensor for measuring the pressure in one of said plurality of variable buoyancy-generating chambers.

17. An apparatus as recited in claim 1, in which said CPU is connected to a water sensor for measuring the amount of water in one of said plurality of variable buoyancy-generating chambers.

18. An apparatus as recited in claim 1, in which said CPU is connected to a temperature sensor for measuring temperature.

19. An apparatus as recited in claim 1, in which said CPU is connected to an inhale valve to change said volume of water in one of said plurality of variable buoyancy-generating chambers.

20. An apparatus as recited in claim 1, in which said CPU is connected to an exhale valve to change said volume of water in one of said plurality of variable buoyancy-generating chambers.

21. An apparatus as recited in claim 1, in which said CPU is connected to an emergency valve to change said volume of water in one of said plurality of variable buoyancy-generating chambers in the event of an emergency.

* * * * *